Oct. 6, 1970

SHOTA HIYAMUDA 3,531,921

HARVESTER

Filed Aug. 14, 1967

INVENTOR
SHOTA HIYAMUDA
BY *Bacon & Thomas*
ATTORNEYS

Oct. 6, 1970 SHOTA HIYAMUDA 3,531,921
HARVESTER

Filed Aug. 14, 1967 35 Sheets-Sheet 3

INVENTOR
SHOTA HIYAMUDA
BY Bacon & Thomas
ATTORNEYS

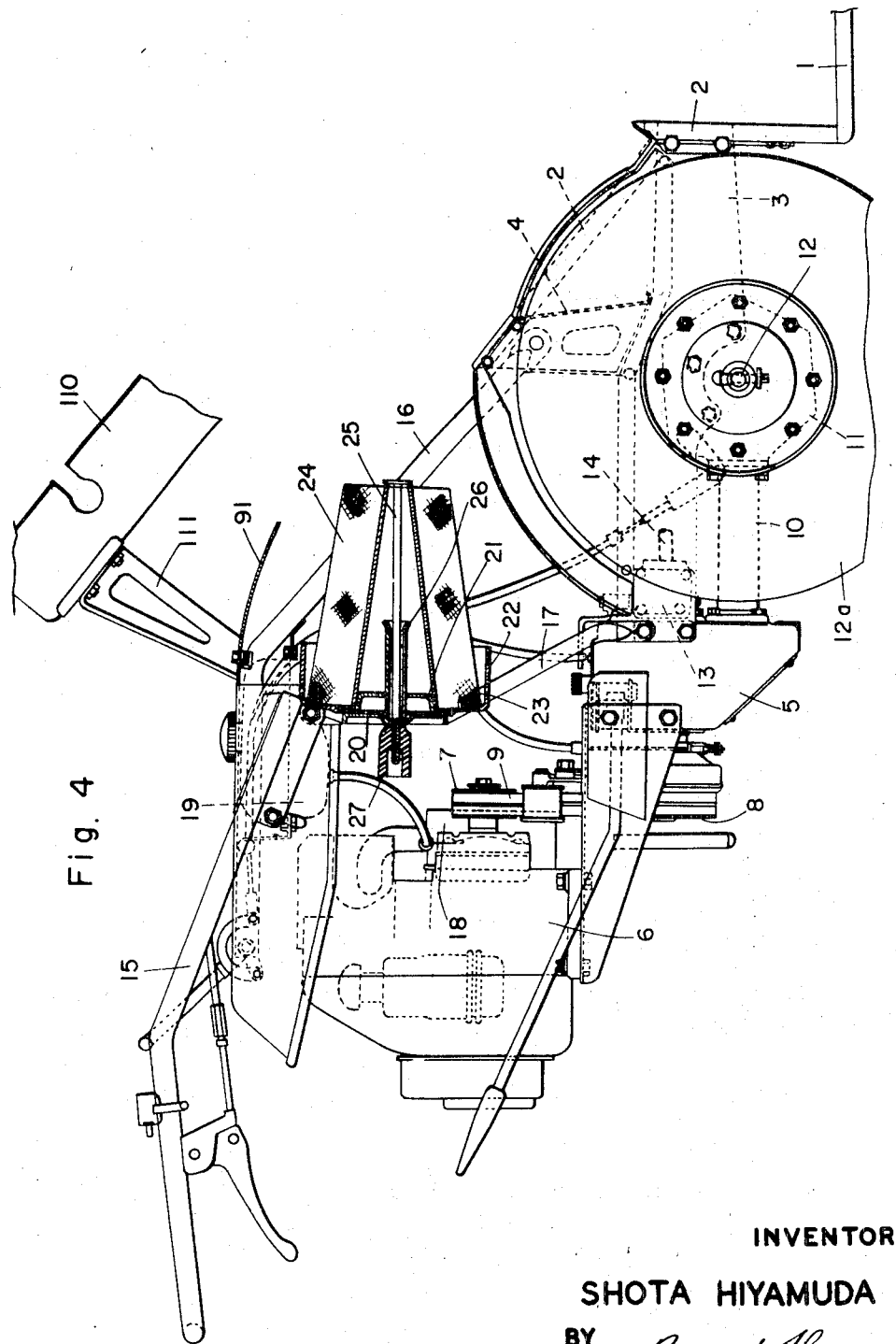

Oct. 6, 1970  SHOTA HIYAMUDA  3,531,921
HARVESTER
Filed Aug. 14, 1967  35 Sheets-Sheet 5
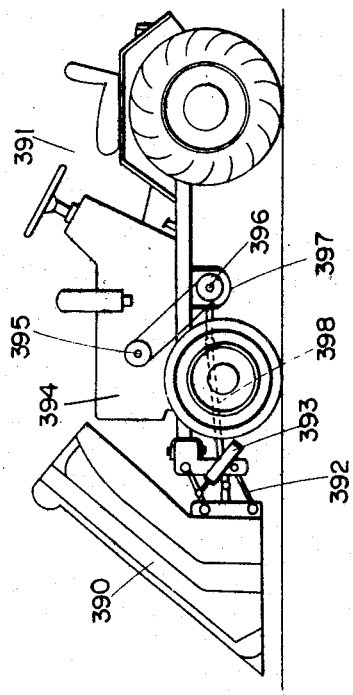
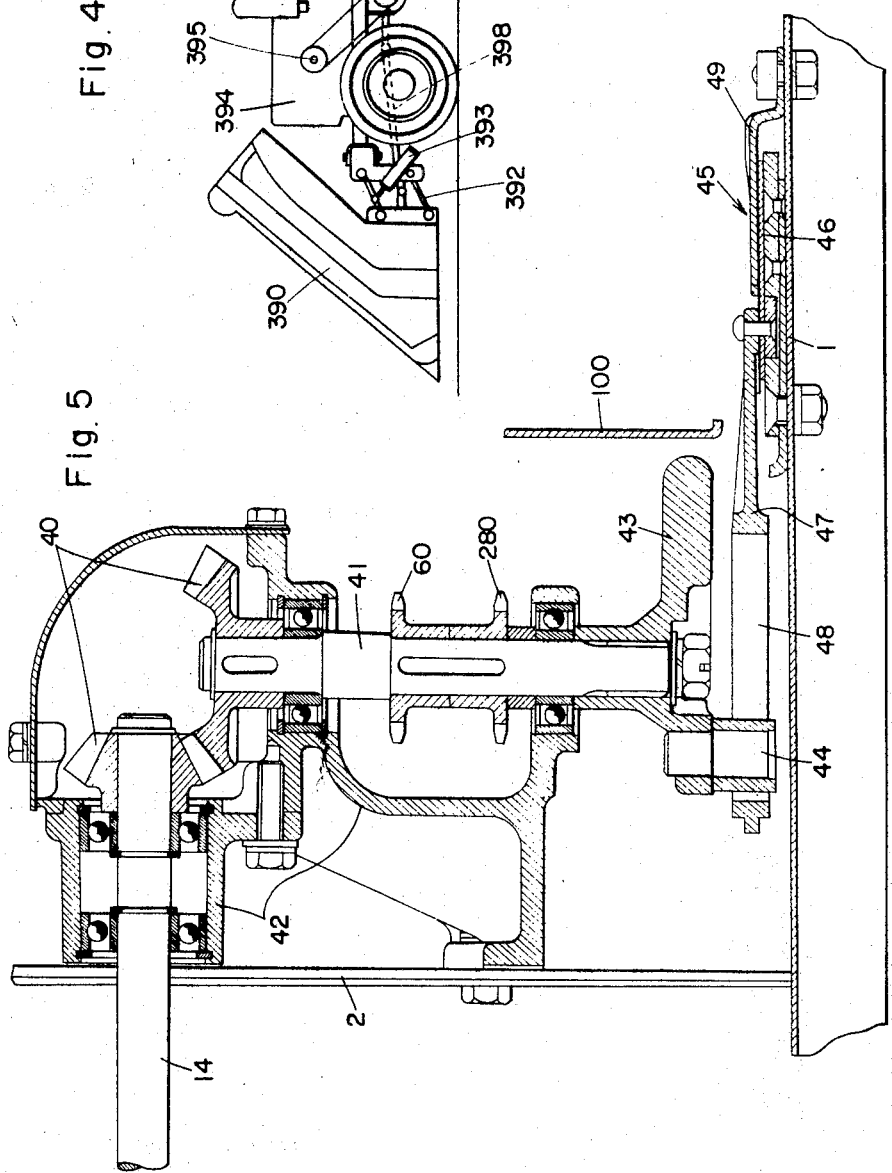
INVENTOR
SHOTA HIYAMUDA
BY *Bacon & Thomas*
ATTORNEYS

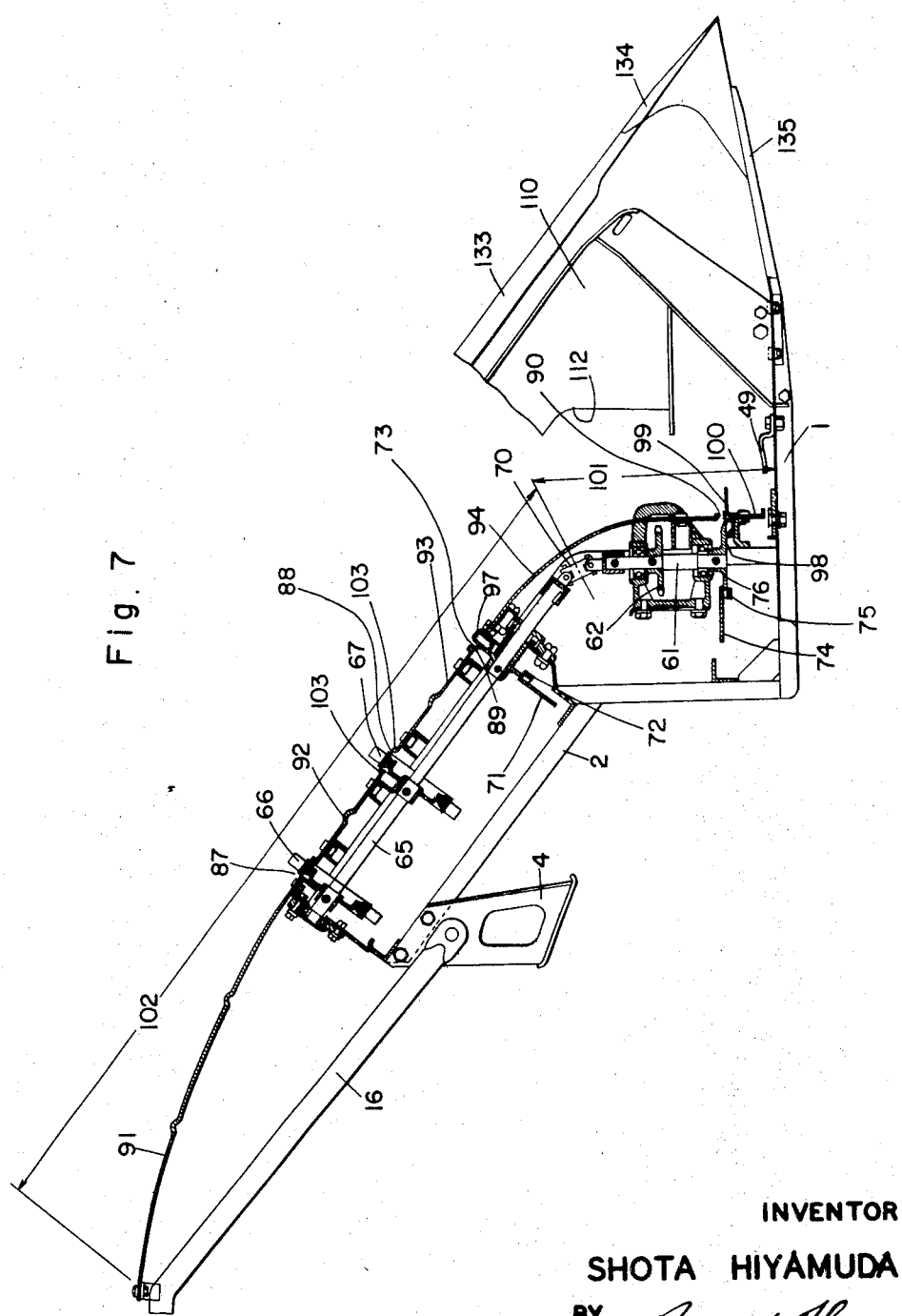

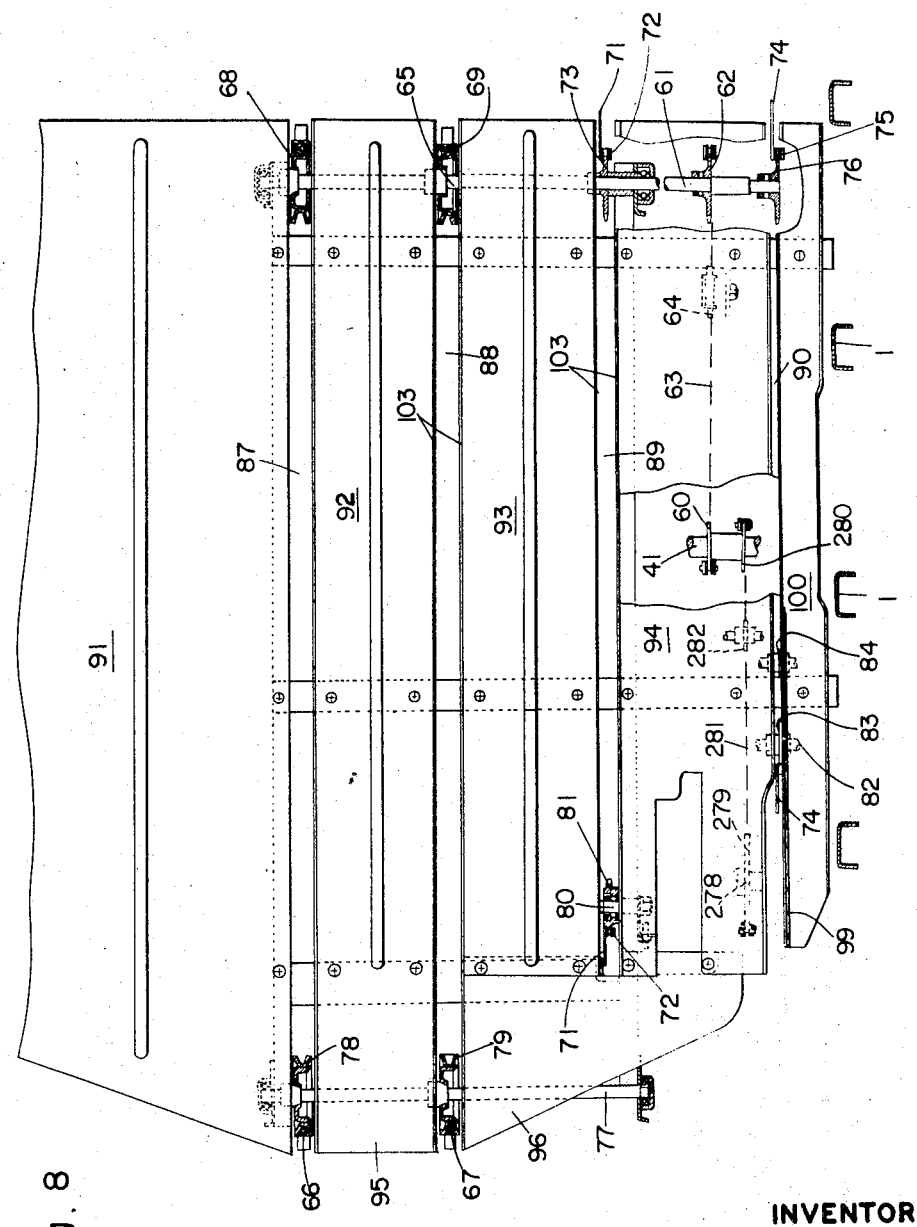

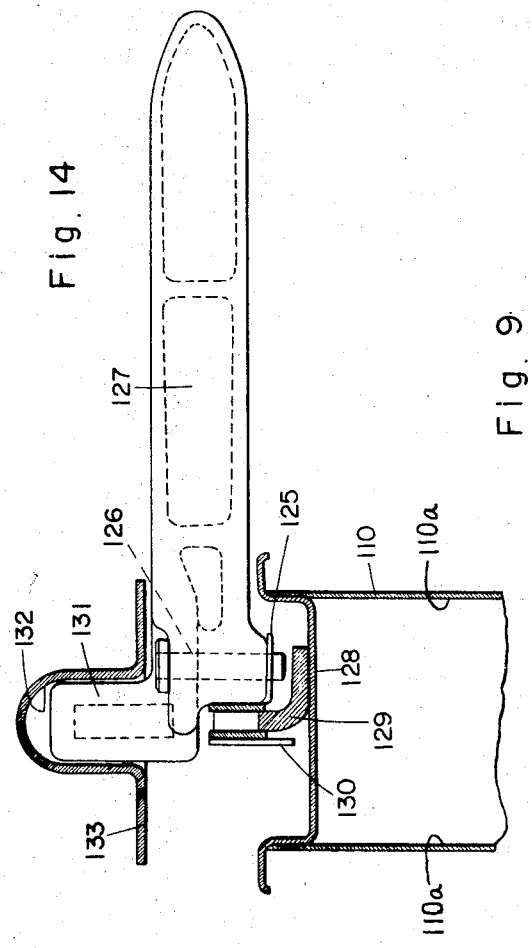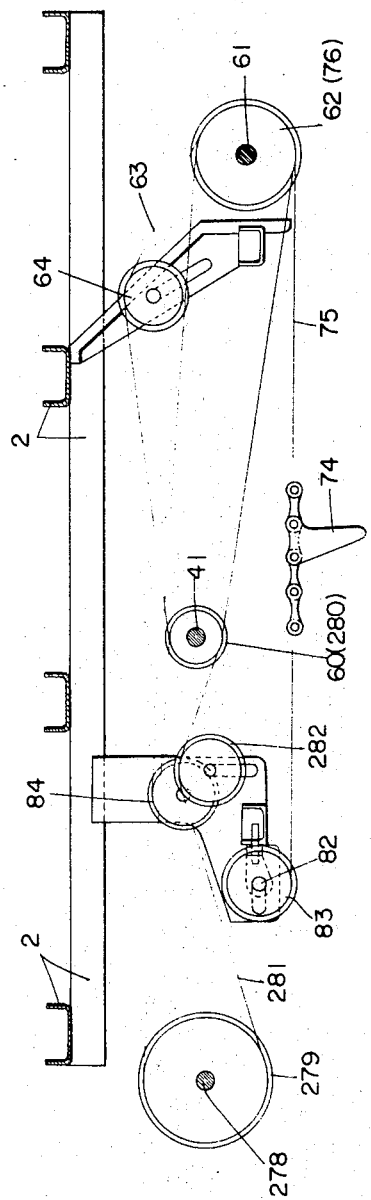

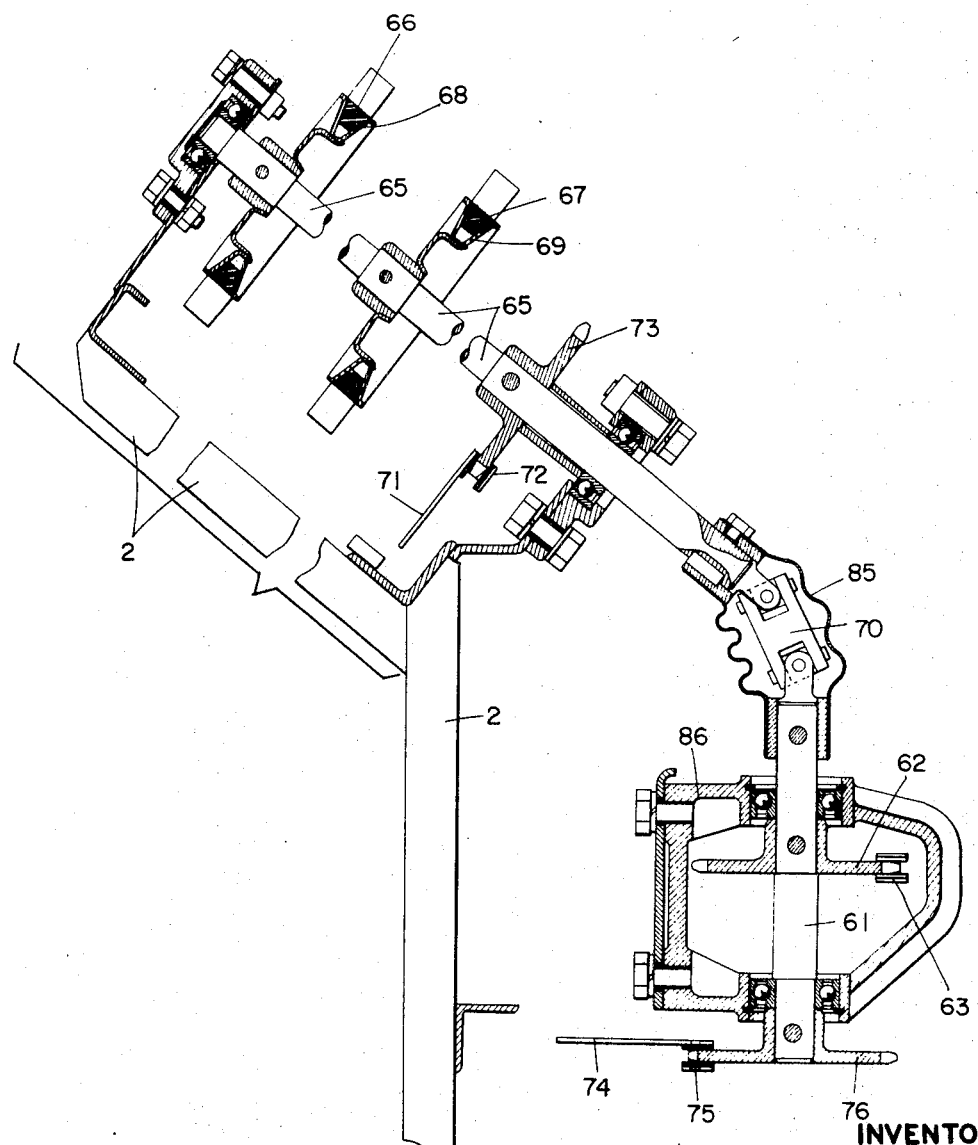

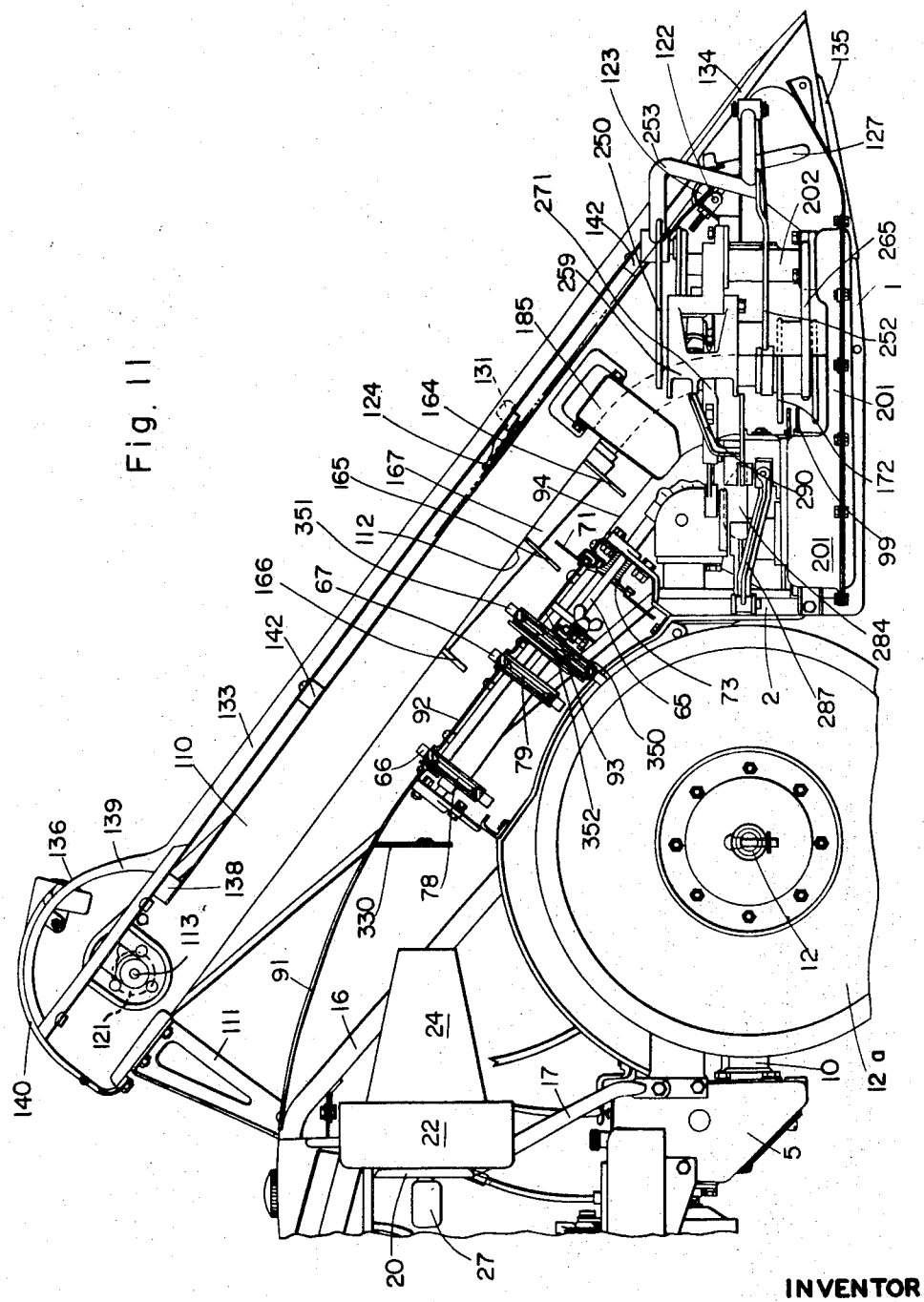

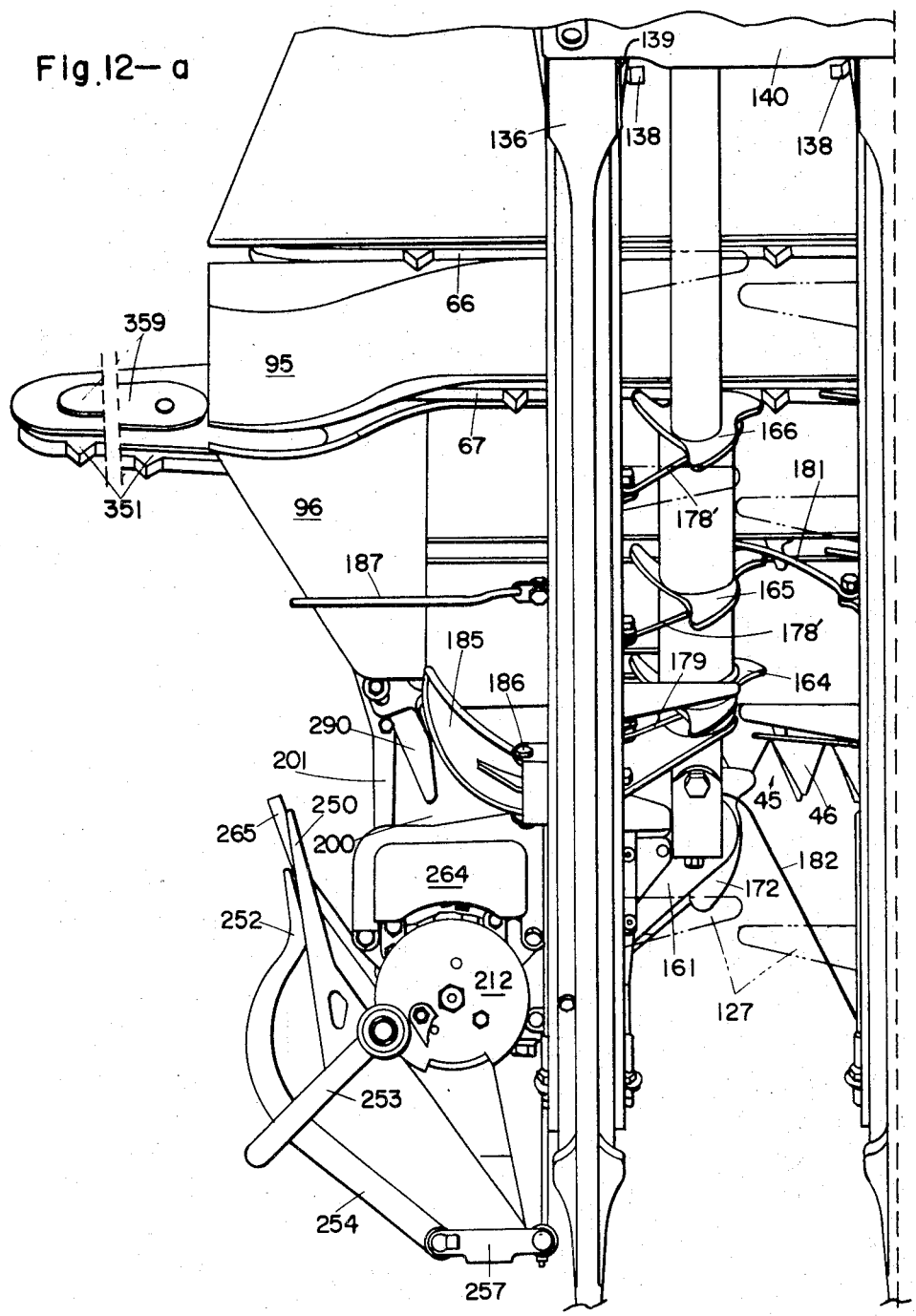

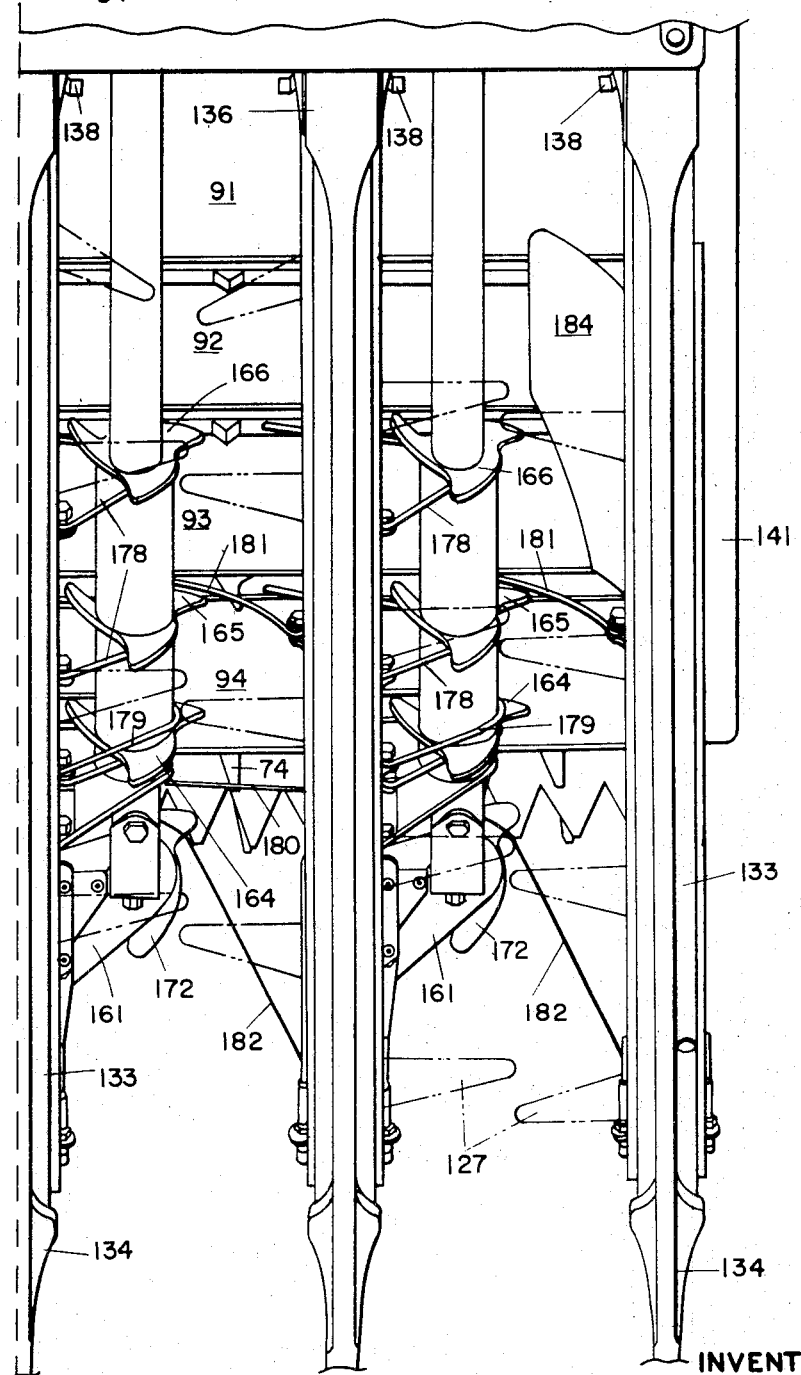

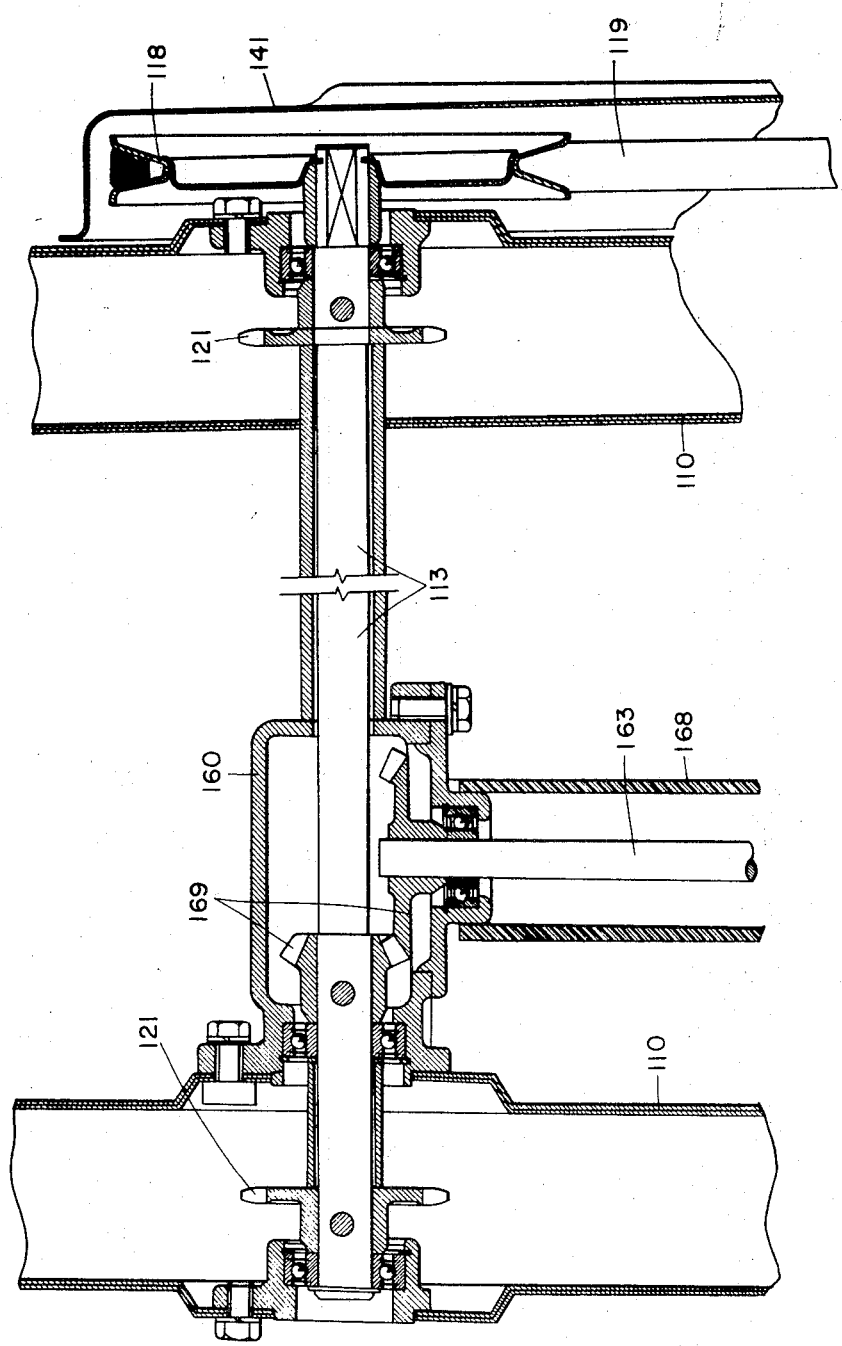

Oct. 6, 1970 SHOTA HIYAMUDA 3,531,921
HARVESTER
Filed Aug. 14, 1967 35 Sheets-Sheet 15
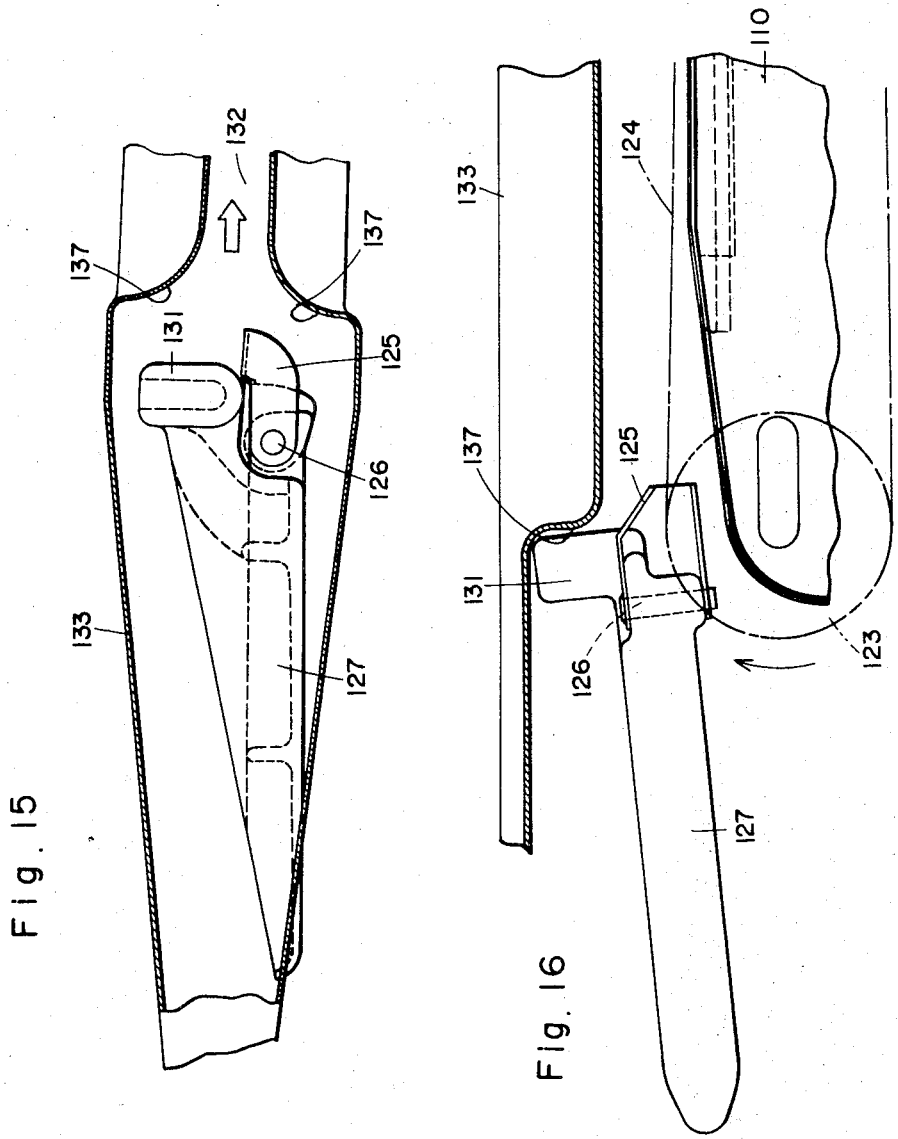
INVENTOR
SHOTA HIYAMUDA
BY *Bacon & Thomas*
ATTORNEYS

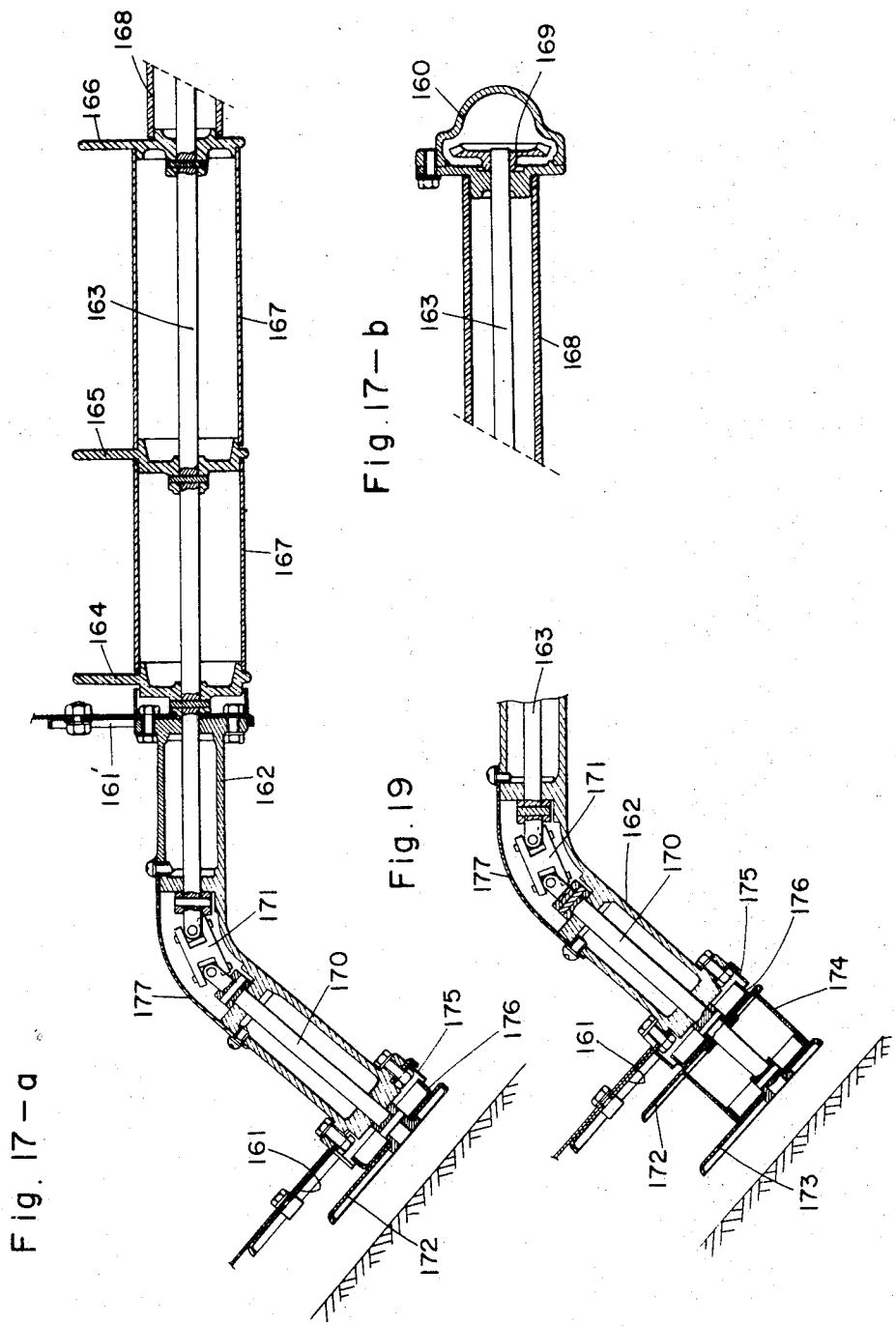

Oct. 6, 1970  SHOTA HIYAMUDA  3,531,921
HARVESTER

Filed Aug. 14, 1967  35 Sheets-Sheet 17

INVENTOR
SHOTA HIYAMUDA
BY Bacon & Thomas
ATTORNEYS

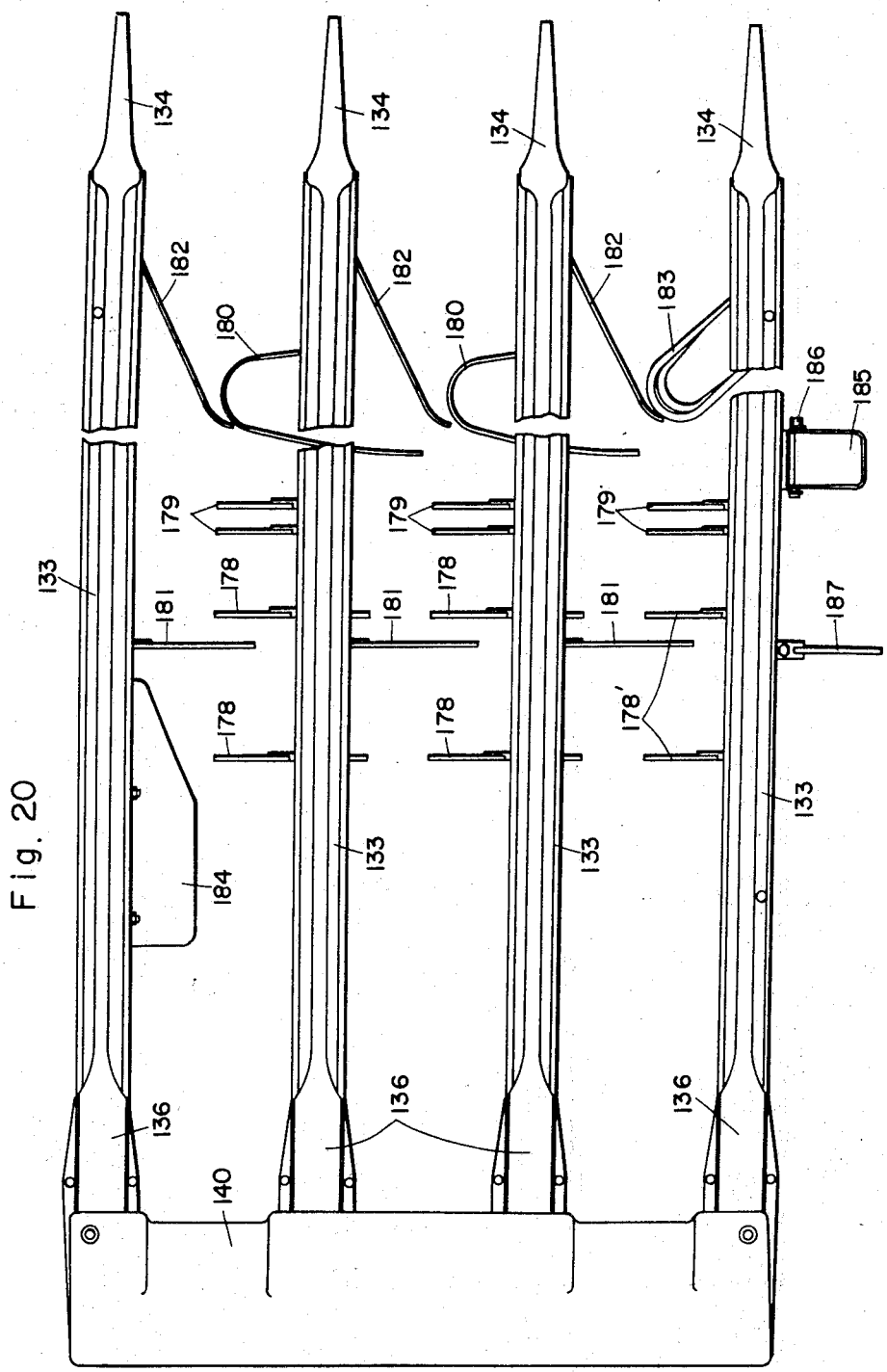

Oct. 6, 1970    SHOTA HIYAMUDA    3,531,921
HARVESTER

Filed Aug. 14, 1967    35 Sheets-Sheet 19

INVENTOR
SHOTA HIYAMUDA
BY Bacon & Thomas
ATTORNEYS

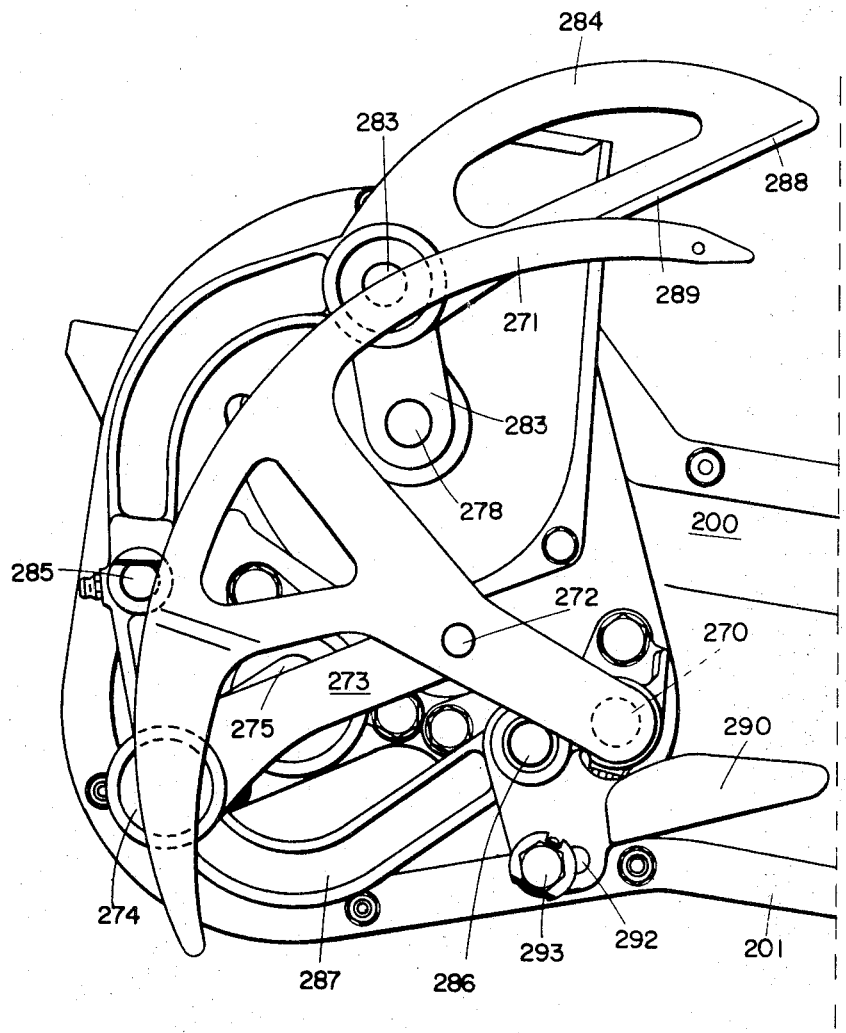
Fig. 27-a

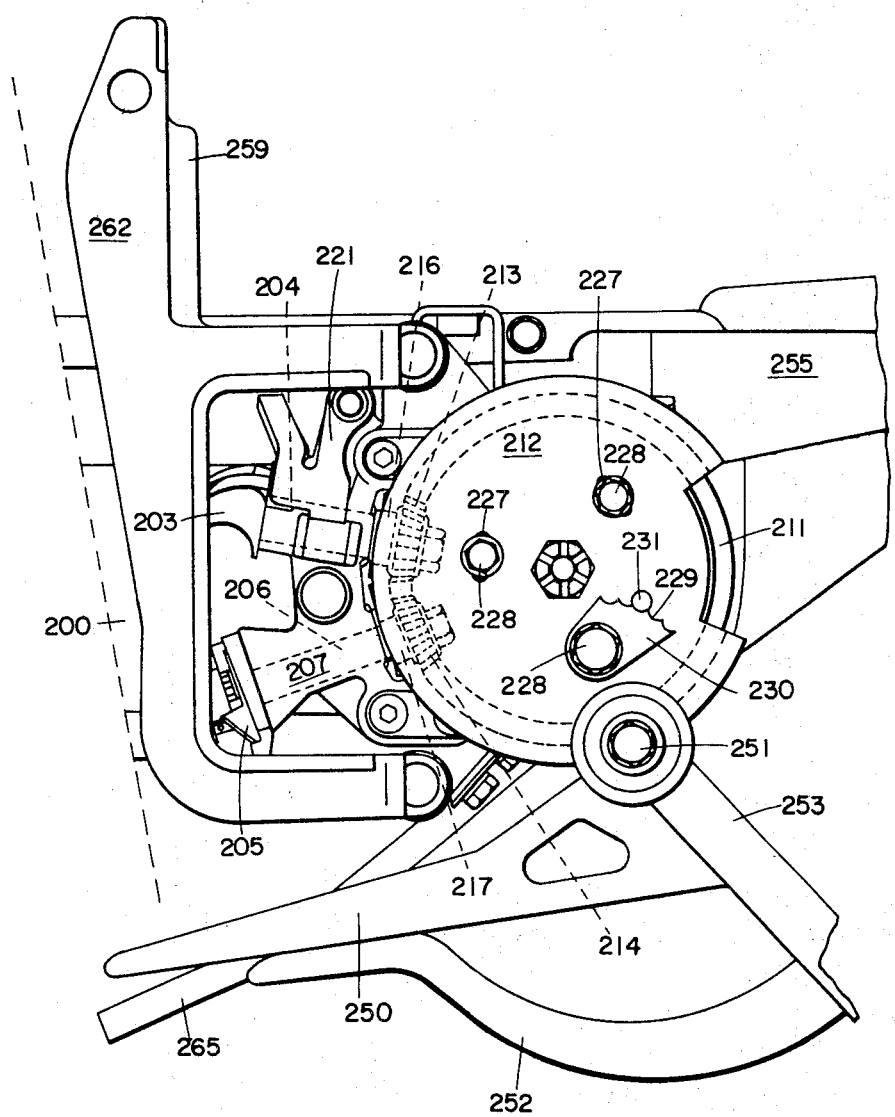

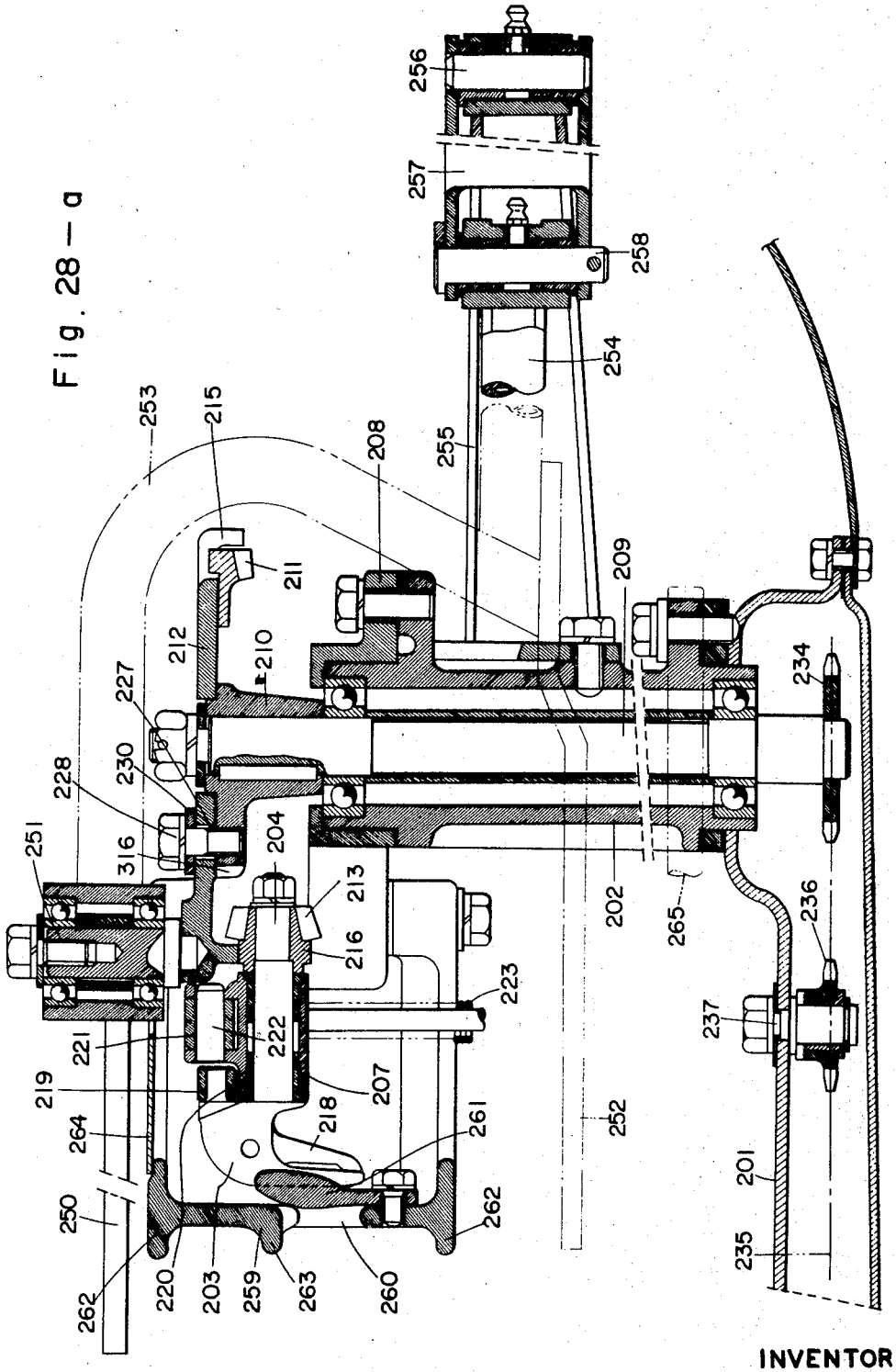

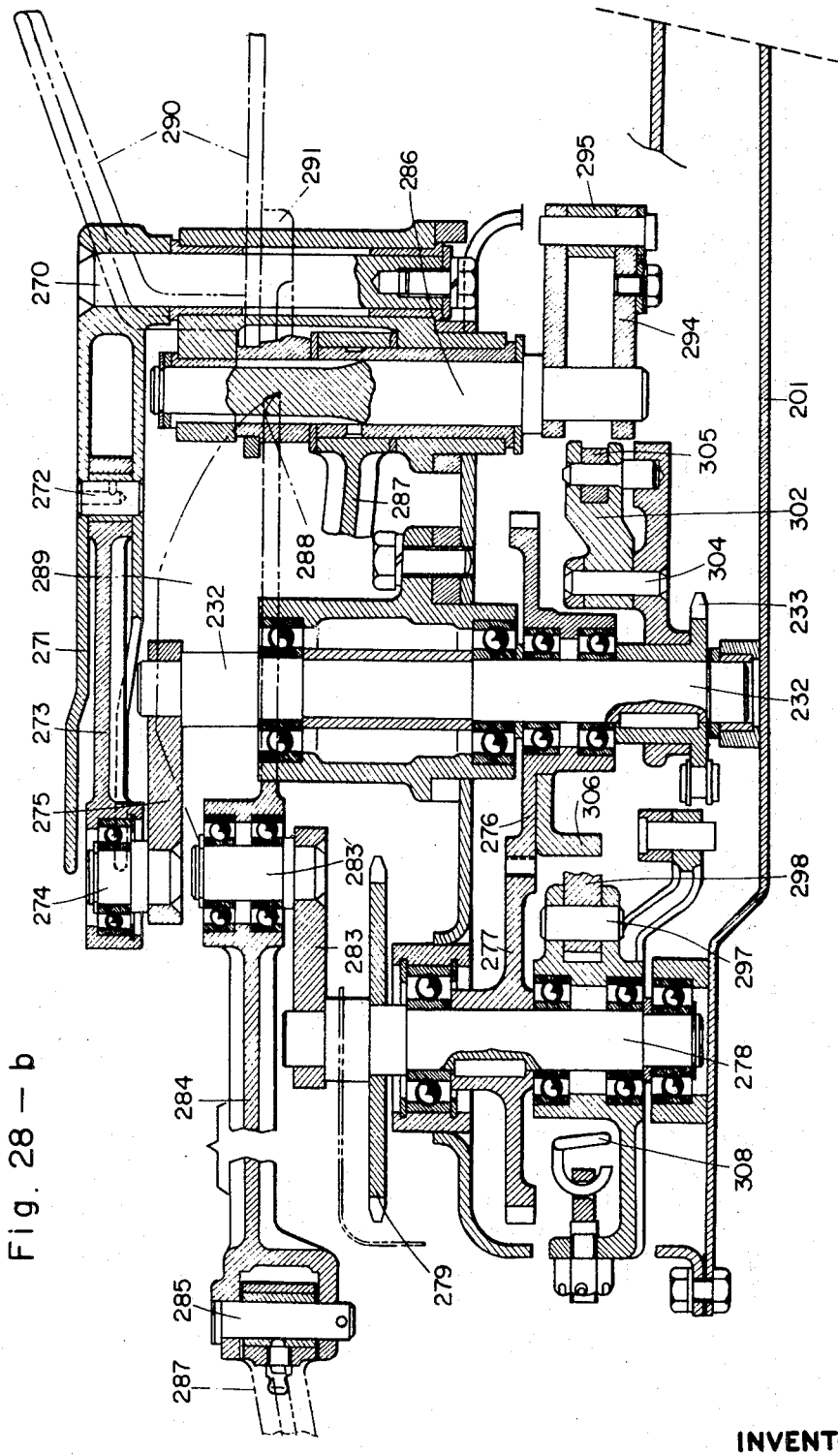
Fig. 28-b

Oct. 6, 1970 SHOTA HIYAMUDA 3,531,921
HARVESTER
Filed Aug. 14, 1967 35 Sheets-Sheet 25

INVENTOR
SHOTA HIYAMUDA
BY Bacon & Thomas
ATTORNEYS

Oct. 6, 1970  SHOTA HIYAMUDA  3,531,921
HARVESTER

Filed Aug. 14, 1967  35 Sheets-Sheet 26

INVENTOR
SHOTA HIYAMUDA
BY *Bacon & Thomas*
ATTORNEYS

Oct. 6, 1970  SHOTA HIYAMUDA  3,531,921
HARVESTER
Filed Aug. 14, 1967  35 Sheets-Sheet 28

INVENTOR
SHOTA HIYAMUDA
BY Bacon & Thomas
ATTORNEYS

Oct. 6, 1970   SHOTA HIYAMUDA   3,531,921
HARVESTER

Filed Aug. 14, 1967   35 Sheets-Sheet 29

INVENTOR
SHOTA HIYAMUDA
BY *Bacon & Thomas*
ATTORNEYS

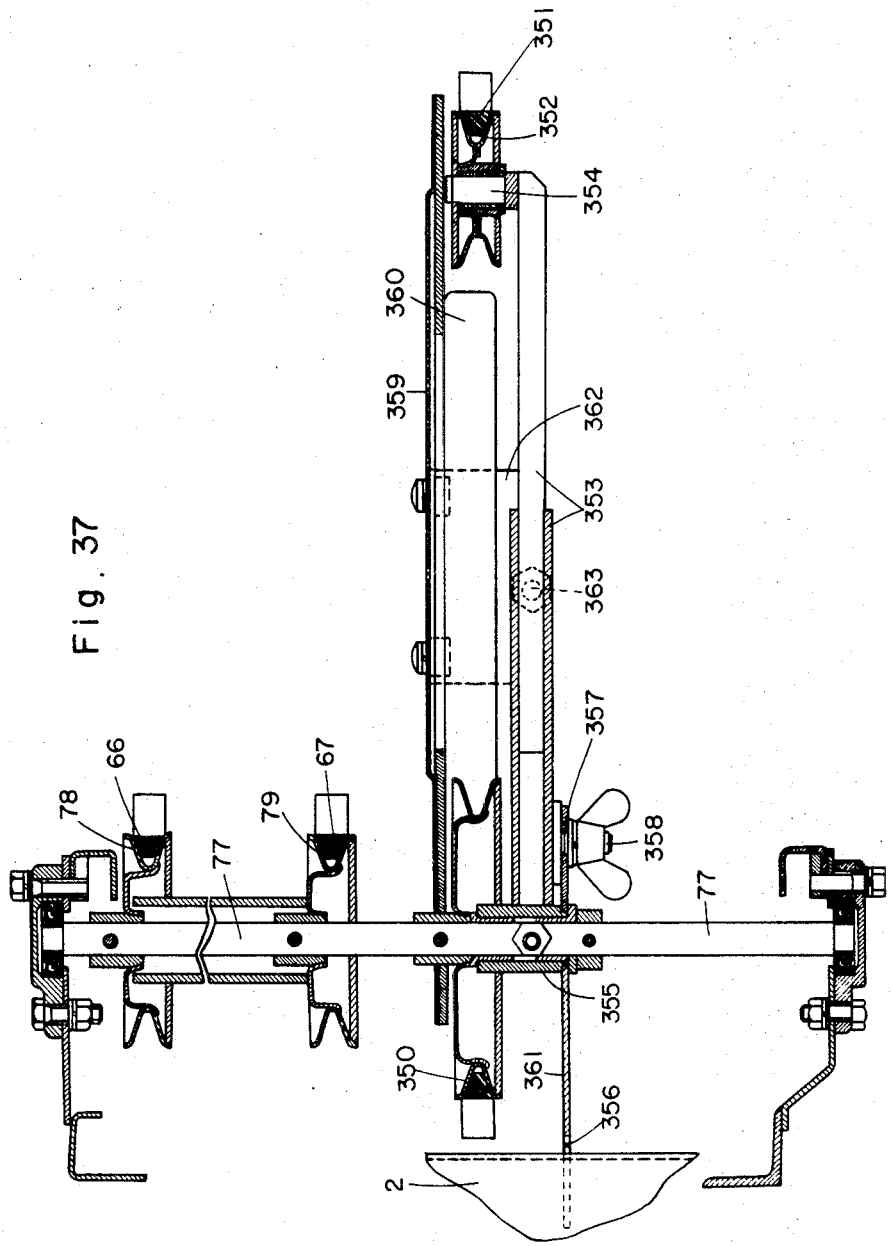

Oct. 6, 1970　　　　SHOTA HIYAMUDA　　　　3,531,921
HARVESTER

Filed Aug. 14, 1967　　　　　　　　　　　　　35 Sheets-Sheet 32

INVENTOR
SHOTA HIYAMUDA
BY *Bacon & Thomas*
ATTORNEYS

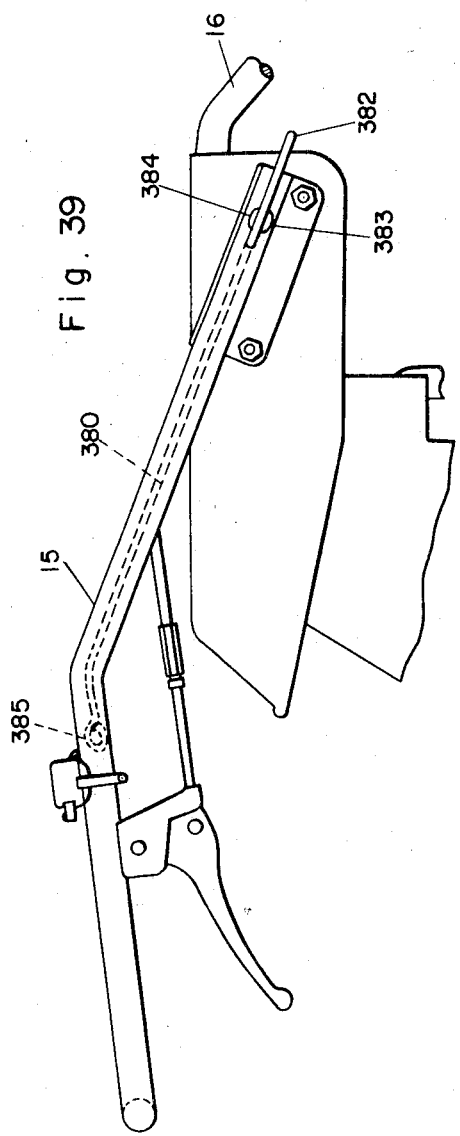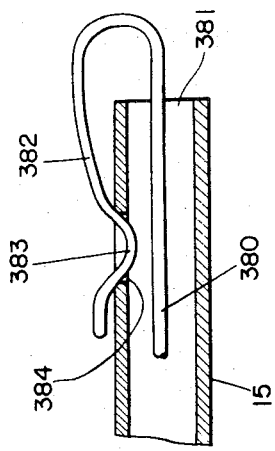

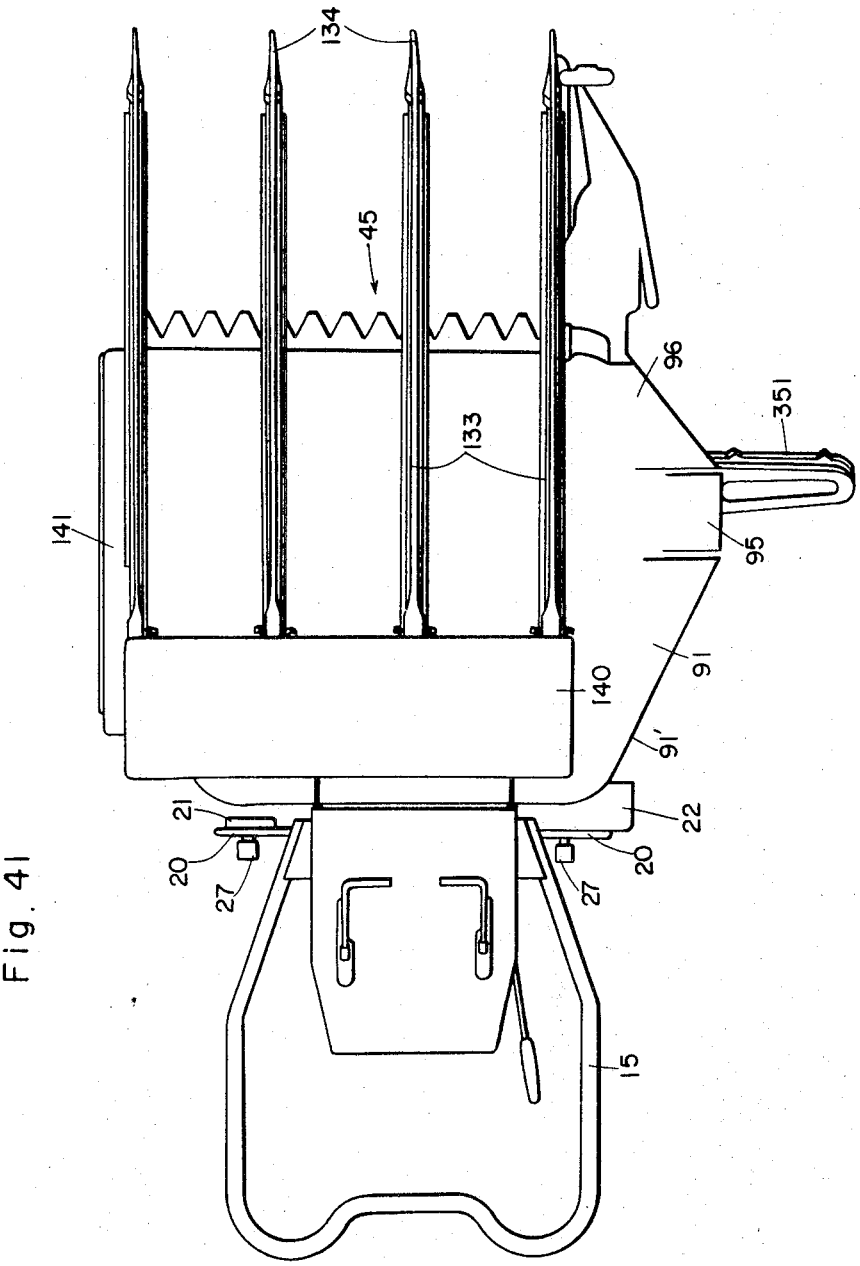

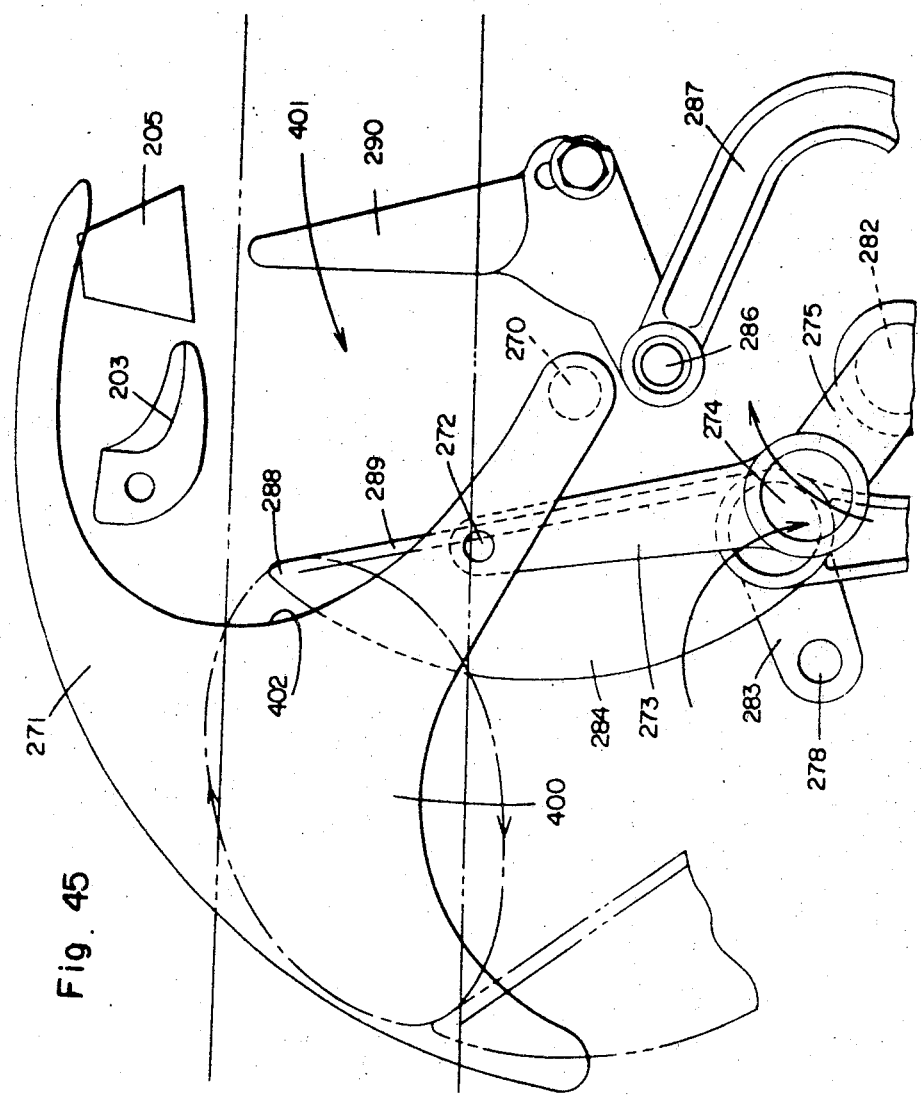

United States Patent Office 3,531,921
Patented Oct. 6, 1970

3,531,921
HARVESTER
Shota Hiyamuda, Sakai, Japan, assignor to Kubota Tekko Kabushiki Kaisha, Osaka-shi, Naniwa-ku, Japan, a company of Japan
Filed Aug. 14, 1967, Ser. No. 660,501
Claims priority, application Japan, Aug. 13, 1966, 41/53,109
Int. Cl. A01d 37/00
U.S. Cl. 56—22         12 Claims

ABSTRACT OF THE DISCLOSURE

A self-propelled harvester comprising a forwardly facing plane, a cutting means in front of said plane, a pick-up means that extends rearwardly and upwardly substantially linearly from near the ground in front of the cutting means, the top of the pick-up path being positioned before and near the top of said plane, a transferring means positioned immediately rearwardly and upwardly of said cutting means and serving to transfer stalks transversely only in one direction at a time across said plane, and a binding means at the outer end of said plane.

BACKGROUND OF THE INVENTION

Various types of harvesters are known, including that equipped with a pick-up reel. However, it has been impossible to pick up or comb prostrated stalks in such a manner as to bring them into a parallel state.

With another type of harvester so arranged that stalks cut by the right side portion of the cutter are conveyed to the left while those cut by the left side portion thereof are conveyed to the right so that all these stalks are gathered together at the center and conveyed rearwardly, it has been impossible to obtain gathered stalks in parallel, since in case that the ears of the stalks are somewhat inclined, for example, to the right, those conveyed from the right will intersect with those from the left.

There has been no harvester which is designed to assure the parallelism of cut stalks by combining the function of effectively cutting all the stalks to be cut near the roots thereof (even if they are prostrated), after effectively picking up such stalks upwardly and rearwardly to the direction of travel of the machine relative to the machine, with the function of unilaterally transferring all of the thus cut stalks along a guide plane facing to the direction of travel of the machine.

SUMMARY OF THE INVENTION

With the harvester according to the invention, every stalk, even if prostrated almost to the ground, can be raised up, since the machine is adapted to picking up all the stalks to be cut with the cutting means. Moreover, since the machine is adapted to transfer stalks only unilaterally along a guide plane, it is possible to obtain stalks in parallel, even if their ears are somewhat inclined, for example, to the right.

This invention relates to a harvester having reaping means and transversely transferring means for transferring reaped stalks transversely of the machine, and particularly it relates to a harvester adapted to harvesting rice plants, barley and wheat, grass and so forth.

A principal object of the invention is to provide a harvester of the character described which is capable of cutting crops such as rice plants, barley, wheat, grass and so forth positively at the portions near the roots thereof (such portions being hereafter referred to in this specification as stubs) by reaping or cutting means, even when such stalks have been severely prostrated due to storm, flood or the like, while satisfactorily picking up such prostrated stalks.

Another object of the invention is to provide a harvester of the character described which is capable of performing a series of automatic operations of: gathering the thus reaped stalks in order to provide groups of stalks each in a substantially equal amount; binding each group; and ejecting the groups successively in such a manner that they lie in a juxtaposed condition suitable to collecting and threshing operations.

Other objects and advantages of this invention will become apparent from the following detailed description of the preferred embodiment of the invention illustrated in the accompanying drawings.

BRIEF DESCRIPTION OF THE DRAWINGS

In the drawings:
FIG. 4 is a side view of a device for propelling the machine attaching frame, its associated parts, and a device for holding a string;
FIG. 5 is an enlarged side view, in longitudinal section, of parts of actuating devices for the cutting means, the transversely transferring means, the binding means and the pick-up means;
FIG. 7 is an enlarged side view of the transversely transferring device, in longitudinal section, and of a part of a pick-up frame with function of a divider;
FIG. 8 is a fragmentary front view, with parts broken away and shown in section, showing the transversely transferring device with a device for temporarily holding stalks;
FIG. 9 is a schematic plan view showing a transmission mechanism for the transversely transferring device, and its associated parts;
FIG. 10 is a side view, in longitudinal section, showing a driving shaft and its associated parts for the transversely transferring device, with certain parts being omitted for purposes of clarity;
FIG. 11 is an enlarged fragmentary side view, with parts broken away and shown in section, showing the transversely transferring device, a pick-up device with function of a divider, and its associated parts;
FIGS. 12–a and 12–b are enlarged fragmentary plan views showing, in combination with each other, the pick-up devices with the dividing boards, the raking-in device between the dividing boards, the transversely transferring device, the binding device, and their associated parts;
FIG. 13 is an enlarged fragmentary plan view, in cross-section, showing a transmission gear and its associated parts for the pick-up devices and raking-in device;
FIG. 14 is an enlarged front view showing a camming side wall and its associated parts in longitudinal section, and the pick-up nails;
FIG. 15 is an enlarged fragmentary plan view, with parts broken away and shown in section, showing a device for causing the pick-up nails to project into the pick-up path;
FIG. 16 is an enlarged fragmentary schematic side view, with parts broken away and shown in section, showing the same;
FIGS. 17–a and 17–b are enlarged side views, in longitudinal section, showing the raking-in device and its associated parts, in combination with each other.

FIG. 19 is an enlarged side view, in longitudinal section, of a stub raking-in rotating body and its associated parts located near the terminal end of the transversely transferring path;

FIG. 20 is an enlarged fragmentary plan view of the pick-up frames with function of dividing boards, the elastic press-rods for assisting in transversely transferring, and the entanglement-preventive rods;

FIGS. 27–a and 27–b are enlarged plan views showing the binding device comprising in combination a raking-in assembly, a string supplying assembly, the tying assembly and ejecting assembly;

FIGS. 28–a and 28–b are enlarged side views, in longitudinal section, showing the same in combination with each other;

FIG. 37 is an enlarged bottom view, in cross-section, of a stalk discharging device and its associated parts;

FIG. 39 is an enlarged side view of an attachment for a string passing member;

FIG. 40 is an enlarged fragmentary bottom view of the principal portion thereof;

FIG. 41 is a schematic fragmentary plan view of the entire machine, showing the position of the handle;

FIG. 44 is a schematic side view showing a harvester according to the invention attached to a tractor; and FIG. 45 is a plan view of a vital portion of a better, preferred embodiment of the binding device.

DESCRIPTION OF THE PREFERRED EMBODIMENT

The harvester and its associated parts are constructed as follows.

Figure 3:
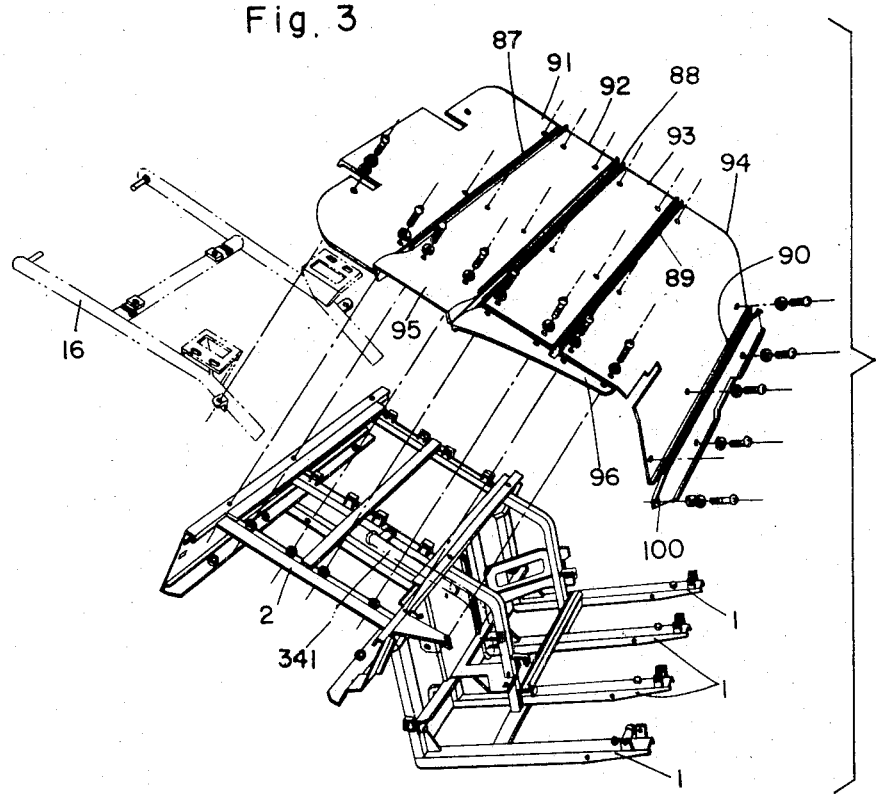
FIG. 3 is an exploded perspective view showing a transverse transfer guide plate of the transversely transferring device, and a frame for attaching the latter.
Figure 36:
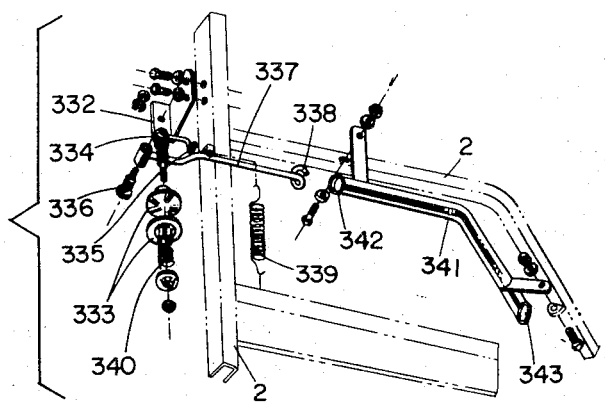
FIG. 36 is an enlarged perspective view thereof.

The frame assembly and its associated parts of the harvester according to the invention are as follows:

As shown in FIGS. 3 and 4, a skeleton frame 2 having four transversely juxtaposed front frames 1 secured to the lower end thereof is secured at its intermediate portion to a central frame 3, and at its upper end to said central frame 3 through a support frame 4. A transmission casing 5 is secured to the rear end of the central frame 3, and a driving pulley 7 attached to an engine 6 carried by said transmission casing 5 is operatively connected through a belt 9 to a driven pulley 8 mounted on the shaft of said transmission casing.

The shafts of the pulleys 7 and 8 and the transmission shafts in the transmission casing 5 are all oriented in the longitudinal direction of the machine. A sleeve 10 extends forwardly from the transmission casing 5 and holds at the front end thereof an axle suppotring casing 11, which supports an axle 12 carrying ground-engaging driving wheels 12a. The axle 12 is driven by a longitudinal shaft extending through said sleeve 10. A clutch box 13 is attached to the transmission casing 5 at a position above the sleeve 10, and holds a longitudinal shaft 14 extending forwardly thereof.

The reference numeral 15 denotes a handle supported from the skeleton frame 2 by means of brace 16, the intermediate portion thereof being supported from the transmission casing 5 by means of braces 17. The muffler 18 of the engine 6 is directed downwardly, with the exhaust port at the front end directed laterally. As a result, a fuel tank 19 located above the engine 6 is subject to a minimum of heat from the exhaust gas and, moreover, the operator is kept free from uncomfortable conditions that might result from the exhaust gas.

String holding means (20, 21, 22, 25, 26 and 27) are shown in FIG. 4, the braces 17 each being provided with plates 20 that project laterally therefrom, each of said plates having a bobbin-fitting projection 21, and a transparent cover 22 therefor. The bottom surface 23 of the transparent cover 22 is so arranged as to contact the bottom surface of a string roll 24, thereby to prevent payed-out string from passing between the bottom of the string roll and the bottom surface of the cover 22. The reference number 25 denotes a fixing bolt for securing the string roll 24 on the bobbin-fitting projection 21, and the numeral 26 denotes a guide tube for said fixing bolt. A fixing nut 27 is provided for securing the fixing bolt 25.

Figure 6:
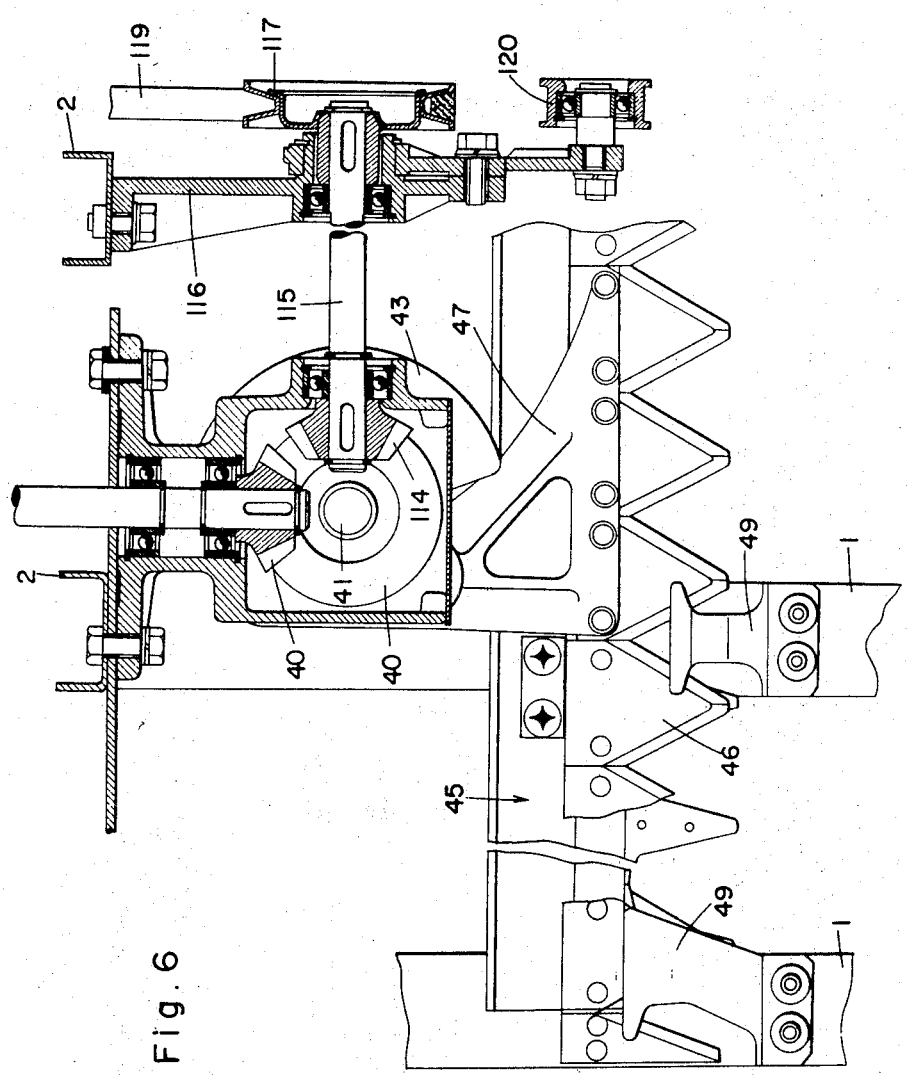
FIG. 6 is an enlarged fragmentary plan view, with parts broken away and shown in section, showing the same.

The cutting means and its associated parts, as illustrated in FIGS. 5 and 6, are as folows:

A vertical shaft 41 is operatively connected through bevel gears 40 to the previously mentioned longitudinal projecting shaft 14, the front portion of the longitudinal shaft 14, the shaft 41, and the bevel gears 40 being supported on the skeleton frame 2 by means of a bracket 42. The lower end portion of the vertical shaft 41 is provided with an eccentric pin 44 projecting therefrom, which is balanced with a weight 43 and which is fitted in an elongated opening 48 in an arm 47 connected to and extending rearwardly from the movable blade body cutting tool 46 of a mower 45, the pin 44 and the opening 48 being arranged to reciprocate the movable blade body 46 upon rotation of the vertical shaft 41. The reference numeral 49 denotes a presser for the movable blade body 46.

The transversely transferring means and its associated parts, as shown in FIGS. 7 through 10, is comprised as follows: As shown in FIG. 8, a sprocket wheel 60 fixedly sucured to the vertical shaft 41 and a sprocket wheel 62 fixedly secured to a vertical shaft 61 journaled at one side of the machine are operatively interconnected by a chain 63, and an oblique shaft 65 operatively connected to said vertical shaft 61 thorugh a universal joint 70 (FIG. 7) is journaled on the skeleton frame 2 and has two spaced pulleys 68 and 69 fixedly secured thereto around which are wrapped transversely transferring units (a pair of ear transfer belts) 66 and 67, respectively. The oblique shaft 65 also has a sprocket wheel 73 fixedly secured thereto near the lower end thereof around which is wrapped a transversely transferring unit (a chain) 72 having transport lugs 71 thereon.

Fixedly secured to the lower end of the vertical shaft 61 is a sprocket wheel 76, around which is wrapped a transversely transferring unit (a chain) 75 having transport lugs 74. Fixedly secured to an oblique shaft 77 journaled on the skeleton frame 2 at the other end of the machine and lying substantially parallel to the oblique shaft 65 are pulleys 78 and 79, around which are wrapped the ear transfer belts 66 and 67. At a position aligned with the sprocket wheel 73, and nearer to the center of the machine than the oblique shaft 77, a sprocket wheel 81 is supported on a shaft 80 journaled on the skeleton frame 2, the chain 72 being wrapped about said wheel. Further, at a position nearer to the center of the machine than the shaft 80 and aligned with the sprocket wheel 76 fixed to the shaft 61 there is mounted on the skeleton frame 2 a sprocket wheel 83, around which is wrapped the chain 75.

As shown in FIG. 10, the reference numeral 85 denotes an elastic cover which covers the universal joint 70, and the reference numeral 86 denotes a support frame which supports the vertical shaft 61. The reference numeral 64 (FIG. 9) denotes a chain-tightening sprocket wheel for tightening the chain 63, and the reference numeral 84 denotes a guide sprocket wheel for guiding the chain 75.

As shown in FIGS. 7 and 8, secured to the skeleton frame 2 are forwardly facing transversely transferring guide plates 91, 92, 93, 94 and 100, which define guide grooves 87, 88, 89 and 90, and paths of transversely transferring movement of the aforementioned transport lugs 71, 74 and the ear transfer belts 66 and 67. The ear transfer belts 66 and 67, and the transport lugs 71 and 74, project upwardly from the guide surface formed by the transversely transferring guide plates 91–94 and 100 through the guide grooves 81, 88, 89 and 90, and move transversely of said guide surface. Said guide surface has a lower portion which is substantially vertical (as shown in FIG. 7), and the remaining or upper portion thereof is rearwardly and upwardly inclined.

Figure 1:
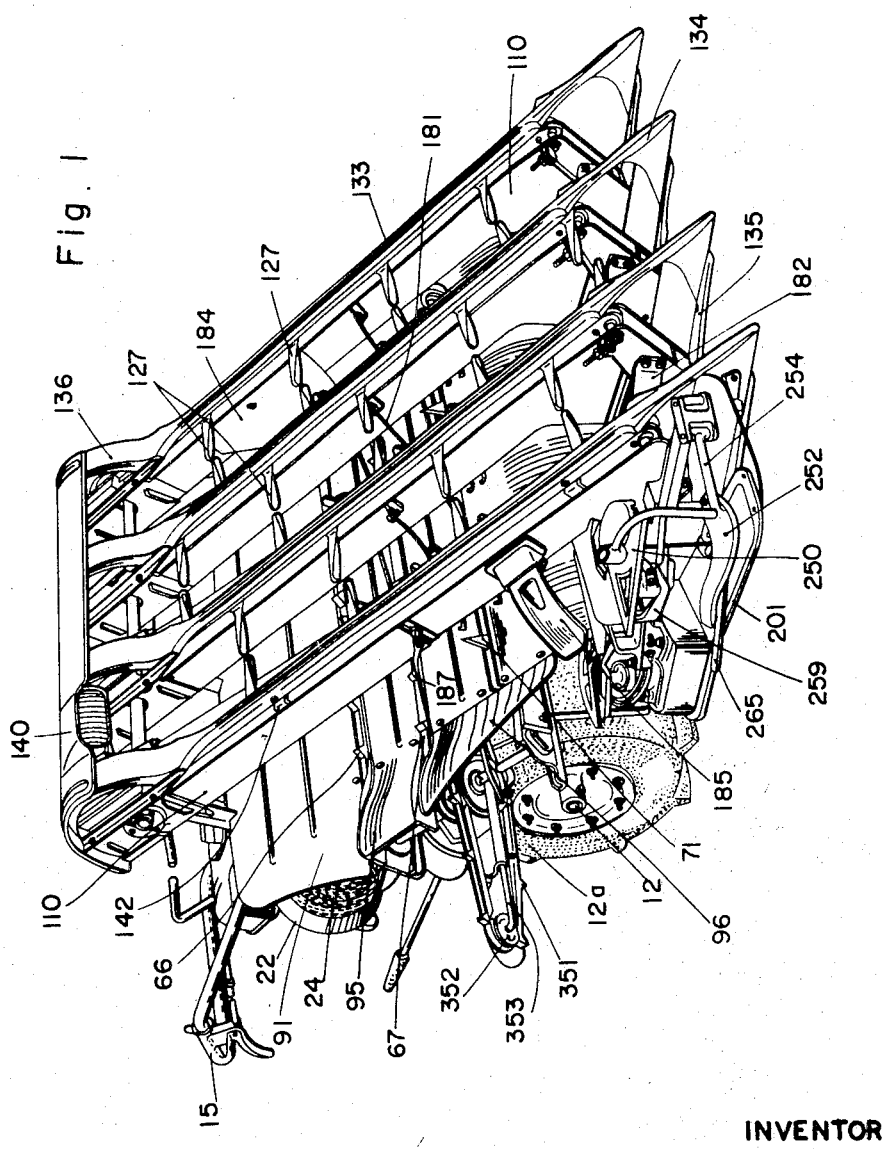
FIG. 1 is a perspective view of the entire machine as viewed forwardly thereof.
Figure 2:
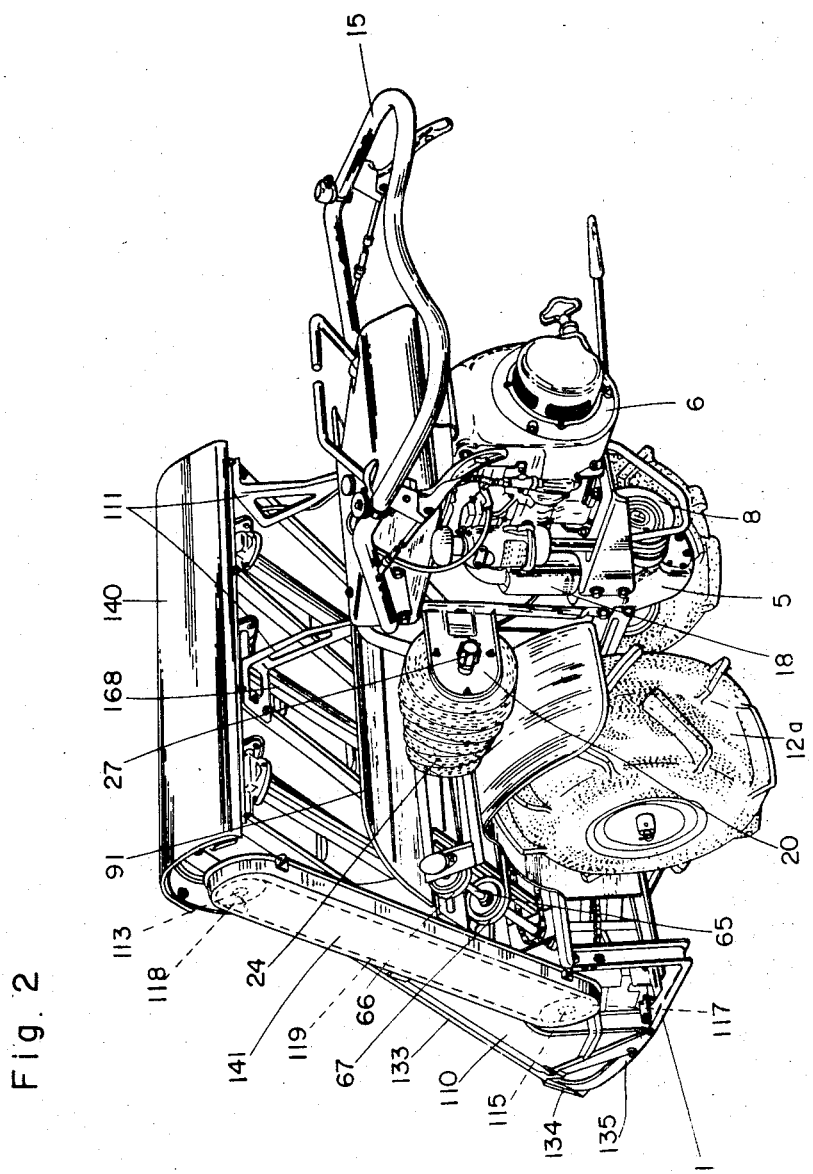
FIG. 2 is a perspective view of the machine as viewed rearwardly thereof.

Means is provided for temporarily holding stalks, comprising raised potrions 95 and 96 on the plates 92 and 93, a collecting presser plate 185, and a collecting presser bar 187, as shown in FIG. 1 (also see FIGS. 8 and 12–a). The members 185 and 187 are more fully desicrbed hereinafter. The raised potrions 95 and 96, which serve to nullify the transversely transferring action of the ear transfer belts 66 and 67 at the terminal end of the transversely transferring path, are connected to the portions of the transversely transferring guide plates 92 and 93 located at the terminal end of the transversely transferring path. The sprocket wheel 81, as shown in FIGS. 8 and 12-a, is positioned in advance of the raised portion 96, in order that the transport path of the transport lugs 71 may terminate at a position short of the raised portion 96.

Figure 43:
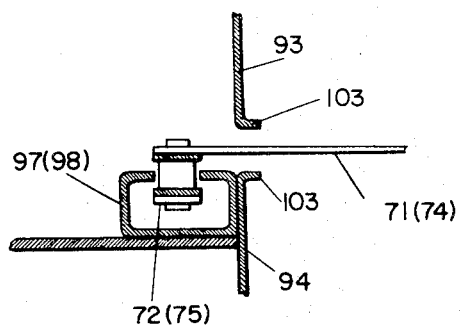
FIG. 43 is an enlarged fragmentary side view, in longitudinal section, showing the forwardly facing guide plates of the transversely transferring device and a guide for a chain with a transversely transferring lug thereon.

As best seen in FIG. 43, chain guide rails 97 and 98 (also see FIG. 7), C-shaped in cross-section, serve to guide the chains 72 and 75. The ends of the legs of said C-shaped guide rails are clamped in position, and said rails guide the rollers of the chains. The reference numeral 99 (FIGS. 7 and 8) denotes a stalk releasing plate for nullifyng the transversely transferring action of the transport lugs 74, at a position short of the terminal end of the transversely transferring path thereof. The divider pickup means and its associated parts, as shown in FIGS. 11 through 13, is comprised as follows: As shown in FIG. 11, dividing boards 110, each fixedly secured to the front of the corresponding front frame 4, are connected at their upper ends to the brace 16 through spacers 111, it being so arranged that the rear side surface of each dividing board 110 extends with a suitable spacing between it and the transversely transferring guide plates 91–94 and 100.

As shown in FIG. 13, a transverse shaft 113 is journaled to extend across the dividing boards 110. As shown in FIG. 6, a transverse shaft 115 operatively connected to the vertical shaft 41 through a bevel gear 114 is supported on the skeleton frame 2 through a support frame 116. A pulley 117 fixedly secured to the outer end of the transverse shaft 115 and a pulley 118 fixedly secured to the transverse shaft 113 (FIG. 13) are operatively interconnected by a belt 119 wrapped therearound. The reference numeral 120 (FIG. 6) denotes a tension pulley for the belt 119, and the numeral 141 (FIG. 13) a belt cover.

The transverse shaft 113 has wheels 121 fixedly secured thereto and located within the rear upper portions of the dividing boards 110, respectively. As shown in FIG. 11 connector chains 124 are wrapped around each set of wheels 121 and 123, each of the latter wheels 123 being supported on a support shaft 122 located within the lower front portion of the corresponding dividing board 110.

As shown in FIG. 14, pick-up nails 127 are supported at suitable intervals by each of the connector chains 124 through support fittings 125, and are mounted in such a manner as to be swingable around the axes 126. Each of said axes 126 is perpendicular both to the transverse direction and to the lengthwise direction of the portion on which each of the pick-up rails is mounted by said axes, respectively, of the connector chain 124.

As shown in FIG. 14, each dividing board 110 has a channel frame 128 attached to the upper side thereof, each frame 128 having a guide rail 129 attached to the middle portion thereof. Thus, the connector chain 124 runs on said guide rail 129 while being guided by the support fittings 125 and flanges 130 attached to said connector chain.

As shown in FIG. 14, each pick-up nail 127 has a cam-follower projection 131 provided near the fulcrum thereof, and, as shown in FIGS. 11 and 14, a cover 133 has a first camming side wall 132, formed with lateral extensions at both sides thereof serving as slide cam plates for preventing the pick-up nails from upwardly displacing when said nails are in their operative position. The first camming side wall 132 guides the cam follower projection 131, whereby the pick-up nails 127 are maintained in their operative position in which the pick-up nails project through a space defined between the dividing board 110 and the cover 133 into the pick-up path. Each cover 133 is attached at its front portion to the from its front frame 1 through a plant dividing end-pointed member 134 and a ground engaging frame 135, the upper end of said cover 133 being attached to the upper end of its dividing board 110 through an arcuate frame 136 having its center of curvature located on the axis of the transverse shaft 113.

As shown in FIGS. 15 and 16, the reference numeral 137 denotes abutment projections provided on both sides of the inlet of the first camming side wall 132 near the front of said cover 133. Thus, as the cam-follower projections 131 of the traveling pick-up nails 127 are brought into abutment with the abutment projection 137, the pick-up nails will be caused to laterally project. When the pick-up nails 127 are in their return path after completion of a pick-up operation, they move in the interior of the dividing board 110 while being guided by the second camming side walls 110a, as shown in FIG. 14.

In FIG. 12, each dividing board 110 has one or two elastic elements 138 serving to dependably rotatively return the pick-up nails 127 into the width of the dividing board 110, by reasons of the fact that the pick-up nails 127 abut against said elastic element as the cam follower projection 131 leaves the first camming side wall 132. The reference numeral 139 denotes a peripheral plate provided around the side edge of the arcuate frame 136, serving as a guide acting on the free ends of the pick-up nails 127 to prevent said pick-up nails 127 from outwardly turning when said pick-up nails 127 move around the axis of the transverse shaft 113. The reference numeral 140 (FIG. 12) denotes a cover interconnecting the dividing boards 110. The reference numeral 142 (FIG. 11) denotes a connecting member whereby the dividing boards 110 on the extreme ends and the cover 133 thereabove are interconnected.

The raking-in means and its associated parts, as shown in FIGS. 12, 13, 17–a, 17–b and 18, is comprised as follows:

As shown in FIGS. 17–a and 17–b, there are a plurality of oblique shafts 163 each positioned in a space defined between adjacent dividing boards 110, each oblique shaft being supported at its lower end by a bent tube 162 attached to the lower portion of the dividing board 110 through support plates 161 and 161′, and at its upper end by a bevel box 160 (FIG. 13) attached to the upper portion of said dividing board 110. Each oblique shaft 163 has first, second and third raking-in rotating bodies 164–166 secured thereto. As shown in FIGS. 12–a, 12–b, 17–a and 18, a floating tube 167 for prevention of entanglement is rotatably fitted on and positioned between adjacent raking-in rotating bodies, and a floating tube 168 for prevention of entanglement is rotatably mounted between the third raking-in rotating body 166 and the bevel box 160.

As shown in FIG. 13, the oblique shaft 163 and the transverse shaft 113, are operatively interconnected by bevel gears 169. As shown in FIG. 11, the first raking-in, rotating body is located near the bent portion of the bent transversely transferring guide plate 94, and the spacing between the second raking-in rotating body 165 and the transversely transferring guide plate 93 is smaller than the spacing between the third raking-in rotating body 166 and the transversely transferring guide plate 92. The second raking-in rotating body 165 is located near the upper side of the path of travel of the transport lug 71. The third raking-in rotating body 166 is located near the path of travel of the ear transfer belt 67.

A vertical shaft 170 (FIG. 17–a) supported within the lower portion of the bent tube 162 is operatively connected within the bent tube 162 to the oblique shaft 163 through a universal joint 171, and a stub raking-in rotating body 172 is attached to the portion of the vertical shaft 170 projecting below the support plate 101.

Figure 18:
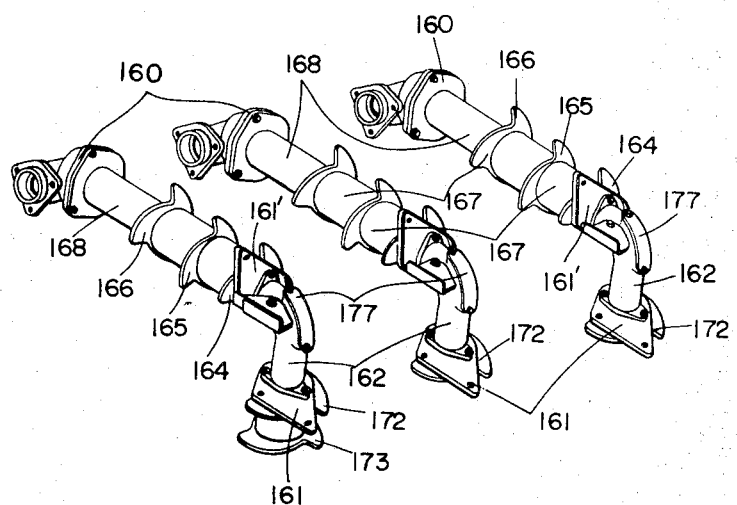
FIG. 18 is a perspective view of the entire raking-in devices.
Figure 21:
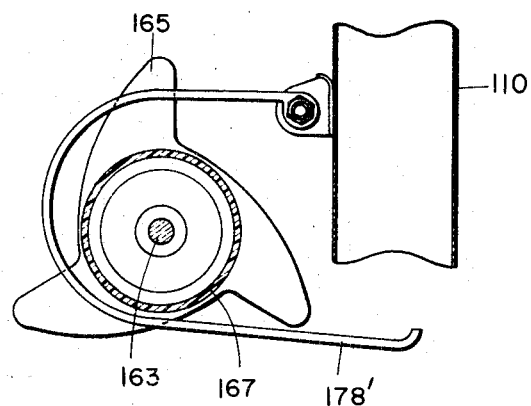
FIG. 21 is an enlarged plan view showing an entanglement-preventive and transversely transferring assisting elastic rod secured to the dividing board located at the terminal end of the transversely transferring path.

Further, as shown in FIGS. 18 and 19, fixedly secured to the particular vertical shaft 170 located at the terminal end of the transversely transferring path is another stub raking-in rotating body 173 located under the previously mentioned stub raking-in rotating body 172, and a sleeve body 174 for prevention of entanglement is positioned between these two raking-in rotating bodies and is attached to the stub raking-in rotating body 173. These two upper and lower raking-in rotating bodies 172 and 173 are positioned forwardly of the aforementioned stalk releasing plate 99 to lie across the latter, as shown in FIG. 11.

In FIGS. 17–a and 19, the reference numeral 175 denotes a fixed sleeve body attached to each support plate 161 concentrically with the corresponding vertical shaft 170, and 176 denotes a rotary sleeve body attached to each stub raking-in rotating body 172 and loosely fitted within the fixed sleeve body 175. The reference numeral 177 denotes a cover plate for an operative window formed in the portion of the bent tube 162 opposed to the universal joint 171.

Figure 22:
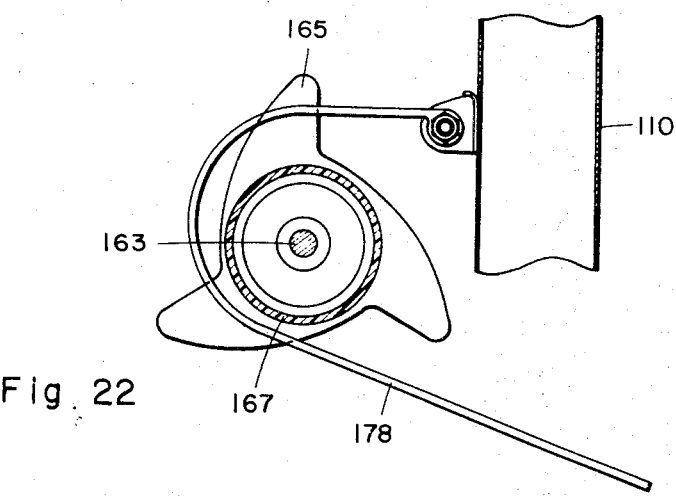
FIG. 22 is an enlarged plan view showing another entanglement-preventing and transversely transferring assisting rod.
Figure 23:
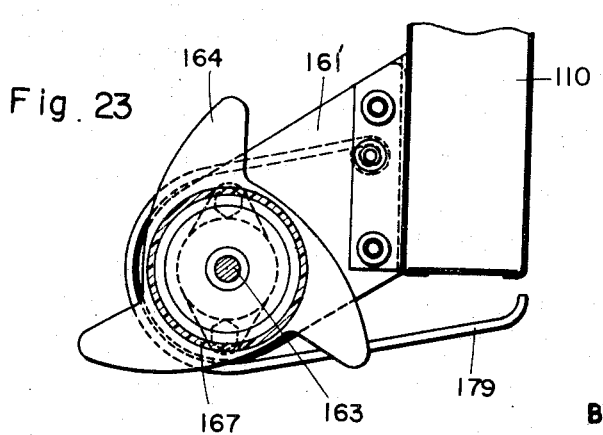
FIG. 23 is an enlarged plan view showing a rotating body for raking-in stalks, an entanglement-preventive supporting plate thereon, and an entanglement-preventing and transversely transferring assisting elastic rod thereunder.

In FIGS. 12 and 20, the reference numeral 178 denotes entanglement preventing and transversely transferring assisting elastic rods extending under the second and third raking-in rotating bodies 165 and 166, each of said rods having its one end fixed to the dividing board 110 and its free end extending along the transversely transferring guide surface in the direction of transversely transferring, as shown in FIG. 22. The reference numeral 179 denotes similar elastic rods which, as shown in FIG. 23, extend respectively above and below the first raking-in rotating body 164.

Figure 24:
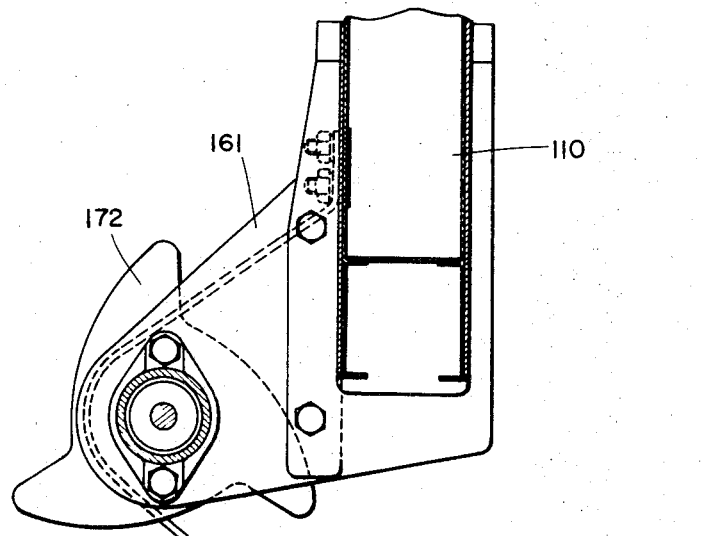
FIG. 24 is an enlarged plan view showing an entanglement-preventing and transversely transferring assisting plate provided for the stub raking-in rotating body and supporting plate.

The reference numeral 180 (FIGS. 20 and 24), denotes entanglement-preventing and transversely transferring assisting elastic plates made of an elastic band plate, which extend below the stub raking-in rotating bodies 172, the bifurcated free end portion thereof extending to a position in which it lies across the path of movement of the transport lugs 74 (FIG. 12).

Figure 25:
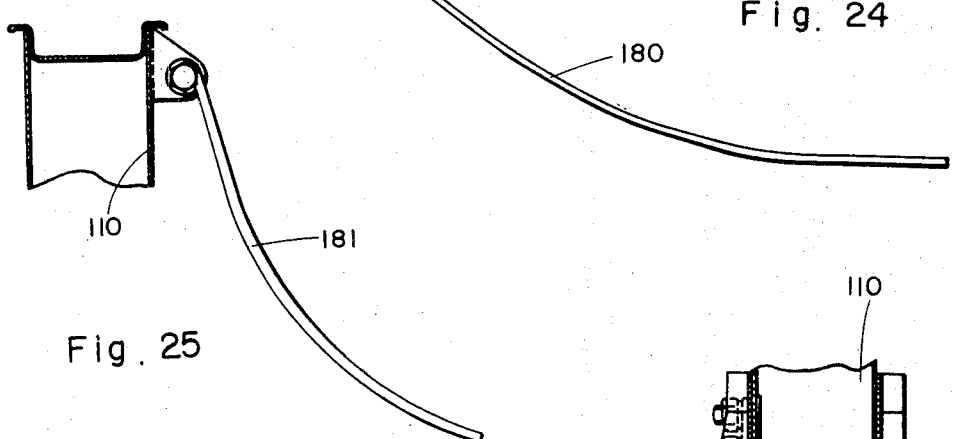
FIG. 25 is an enlarged plan view showing a stalk introducing and guiding elastic rod.

The reference numeral 181 (FIGS. 12 and 20) denotes stalk introducing and guiding elastic rods each connected to the side of the dividing board 110 facing in the direction of transversely transferring, each of which rods (as shown in FIG. 25) extends, while curving, over the transversely transferring guide surface. The reference numeral 182 (FIGS. 12 and 20) denotes similar stalk introducing and guiding elastic plates made of an elastic band plate, the bifurcated end thereof extending to a position in which it lies across the path of the rotation of the tip of the stub raking-in rotating body 172.

Figure 26:
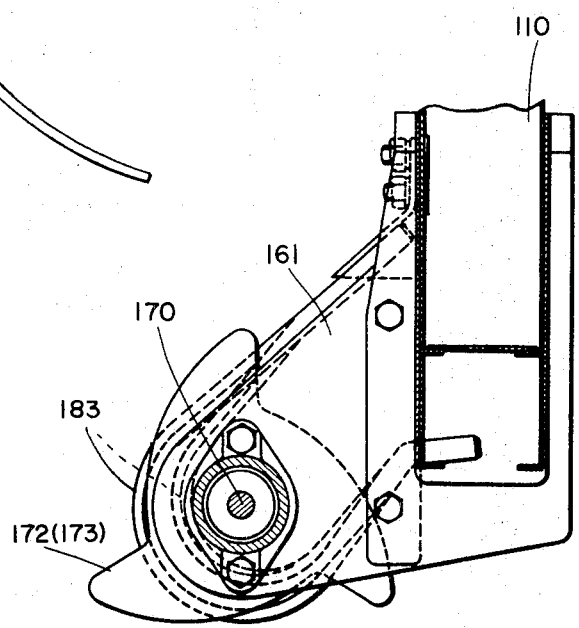
FIG. 26 is an enlarged plan view showing two spaced entanglement-preventive rods provided near the stub raking-in rotating bodies.

The reference numeral 183 denotes entanglement preventing rods, between which is positioned the stub raking-in rotating body 173, as shown in FIG. 26.

The reference numeral 184 (FIGS. 12 and 20) denotes a buffer plate curved and attached to the inner side of the particular dividing board 110 located at the initial end of the transversely transferring path in such a manner as to face in the direction of transverse transfer and positioned in the space through which ears are passed, which buffer plate serves to minimize the falling-out of grains as occurring when the ears of reaped stalks, which tend to lean toward the transversely transferring guide plate, dash against the transversely transferring guide surface.

The reference numeral 185 (FIGS. 12 and 20) denotes a collecting presser plate attached to the outer surface of the dividing board 110 located at the terminal end of the transversely transferring path so as to be positioned adjacent the lower end of the raised portion 96 of the transversely transferring guide plate 93. This is pivoted on a transverse shaft 186, so that it may be resiliently turned by means of a spring (not shown) at all times toward the transversely transferring path.

The reference numeral 187 denotes a collecting presser bar attached to the outer side surface of the particular dividing board 110, namely one provided with said plate 185, so as to be positioned above the raised portion 96.

Figure 29:
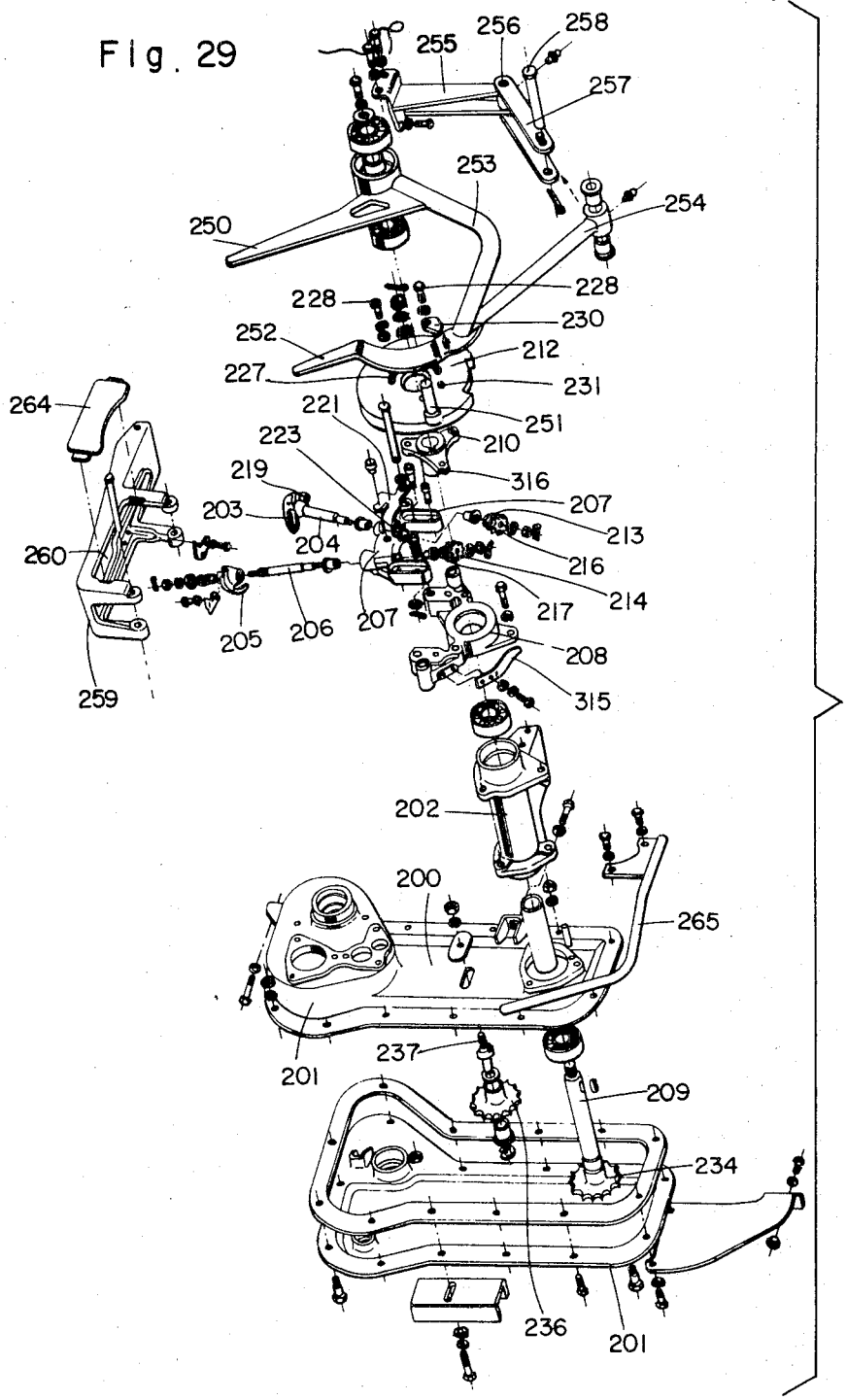
FIG. 29 is an enlarged perspective view of a tying assembly and its associated parts.

The binding means and its associated parts, as shown in FIGS. 27–a through 29 and FIGS. 11 and 12, are as follows:

As shown in FIGS. 11 and 12, a flat transmission casing 201 is attached to the outer side of the front frame 1 located at the terminal end of the transversely transferring path, in such a manner that the intermediate upper surface 200 thereof is substantially flush with the lower side of the transversely transferring path. The upper side of the front end of the flat transmission casing 201 is provided with a sleeve frame 202 projecting therefrom to which, in turn, is attached, through an intermediate member 208, a support frame 207 (FIGS. 27–b and 28–a) supporting a rotary shaft 204 (FIG. 27–b) for a bill 203, and a rotary shaft 206 for a holder 205. As shown in FIG. 28–a, a rotary plate 212 having a sector gear 211 is attached to the upper end of a vertical shaft 209 journaled in said sleeve frame 202 through a member 210. As shown in FIGS. 27–b and 28–a, bevel gears 213 and 214 adapted to mesh with the sector gear 211 are fixedly secured to the rotary shafts 204 and 206, respectively, said bevel gears 213 and 214 being provided with flat-surfaced members 216 and 217 abutting against a rotation-preshaft 278. A spring 313 for preventing the reverse rotation of the disk cam 303 is attached to the casing 201 and is engageable with a shoulder 314 provided on said disk cam 303. A reverse rotation-preventive elastic element 315 shown in FIG. 29 is attached to the intermediate member 208 and is engageable with a shoulder 316 provided on the member 210, thereby to prevent the reverse rotation of the rotary plate 212.

The operation of the thus arranged binding means and its associated parts is as follows:

The driven shaft 278 (FIG. 27–a) is permanently rotating so that the raking-in packer 284 is also permanently executing a reciprocating motion for raking-in of stalks, as mentioned above. Meanwhile, a group of stalks fed by said packer into the tying space is stopped with the stalk stopping door 290. When the amount of the thus stopped stalks reaches a predetermined value and a pushing force from the packer 284 becomes effective to act on the stalk stopping door 290 through the stalks, the stalk stopping door 290 is rotated together with the vertical shaft 286. Concurrently with this turning, the projecting arm 294 (FIG. 32) and the roller 295 turn around the axis of the vertical shaft 286, thus turning the floating member 298 around the axis of the vertical pin 297 through the intermediary of the elongated opening 299 against the force of the tension and compression springs 308 and 309. Therefore, the pawl 300 is disengaged from the pawl 301, with the result that the movable member 302 is turned around the axis of the vertical shaft 304 by means of the spring 307. As a result, the driven roller 305 assumes a position in the path of movement of the transmission projection 306 which is constantly rotating with the gear 276, so that the roller 305 receives the rotation thereof and the needle drive shaft 232 begins to turn through the intermediary of the movable member 302 and disk cam 303. One revolution of the needle drive shaft 232 causes the needle 271 (FIG. 27–a) to execute one reciprocating motion through the intermediary of the rotary arm 275 and link 273.

On the other hand, by means of the vertical shaft 209 (FIG. 28–a) operatively connected to the needle drive shaft 232 through sprocket wheel 233 (FIG. 28–b), chain 235 and sprocket wheel 234, the rotary plate 212 (FIG. 28–a) completes one revolution. Thus, when one-half revolution of the needle drive shaft 232 (FIG. 28–b) is executed after the start of rotation, that is when the needle 271 has supplied a string to the tying assembly, the sector gear 211 (FIG. 27–b) meshes with the bevel gears 213 and 214 to rotate the shafts 204 and 206 by one revolution, respectively, so that the bill 203 and holder 205 knot the string supplied by the needle 271. On the other hand, the ejecting arms 250 and 252 begin to retract with the rotation of the rotary plate 212 and after the completion of the knotting operation by the bill 203 and holder 205, the ejecting arms pass above and below the side plate 259 (FIG. 28–a), respectively, starting to project into the tying space and then effecting the ejection of the tied stalks laterally and outwardly. At this time, the tied stalks fall forward as they stumble against the stationary barrier bar 265 (FIG. 27–b), so that the stalks can positively lie on the ground sideways with respect to the direction of travel of the machine. At the time of the ejection of the stalks by these upper and lower ejecting arms 250 and 253, the roller 311 of the loosely fitted member 296 (FIG. 32) is positioned facing the peripheral recess 312 in the disk cam 303, so that the loosely fitted member 296 is now rendered rotatable around the axis of the driven shaft 278, with the result that the stalks to be ejected can push the stalk stopping door 290 open. At this time, the roller 311 rides on the peripheral surface 310 of the disk cam 303, so that the stalks stopping action by the door 290 becomes again possible. When the needle drive shaft 232 completes one revolution, the pawl 301 abuts against the pawl 300 and is thus prevented from turning around the axis of the drive shaft 232, so that the movable member 302 turns around the axis of the vertical pin 304 against the spring 307 to disengage the driven roller 305 from the transmission projection 306, thereby interrupting the rotation of the disk cam 303. In addition, it is so arranged that when the needle 271 (FIG. 27–a) moves toward the side plate 259 in order to supply the string, the raking-in packer 284 moves somewhat leading the needle 271 and the needle passes immediately above the raking-in packer 284, with the result that smooth supply of string becomes possible, with the needle 271 scarcely catching the stalks.

The means for supplying string to the needle, as shown in FIGS. 34–36 and FIG. 11, is as follows:

As shown in FIG. 11, a plate body 330 positioned in front of one of the string rolls 24 (the other being a spare) and attached to the underside of the uppermost transversely transferring guide plate 91 is provided with a string hole 331 (FIG. 34), and a pair of string brake elements 333 is positioned in front of the string hole 331 and attached to the skeleton frame 2 through a bracket 332. String guides 334 and 335 are provided on both sides of the string brake elements 333 and a string guide 338 is provided on the free end of an arm lever 337 pivotally mounted on said bracket 332 through a vertical pin 336. A spring 339 for laterally swinging the arm lever 337 is interposed between the arm lever 337 and the skeleton frame 2. The reference numeral 340 denotes a spring for pressing said pair of string brake elements 333. A string guide tube 341 (FIG. 36) is attached to the skeleton frame 2 in such a manner that its upper opening 342 is located at a position that the front string guide 338 approaches when said arm lever 337 is forwardly positioned linearly against the spring 339. The lower opening 343 of the string guide tube 341 is located just in the rear of the needle at the stopped position of the needle when returned. Therefore, the string from the string roll is supplied to the needle through the string hold 331 (FIG. 34) via the string guide 334, the contact between the pair of string brake elements 333, string guides 335 and 338, and string guide tube 341. The arm lever 337 swings in accordance with a change in string tension caused as the needle reciprocates.

Guiding the string up to the front end of the needle with the string guide tube 341 in this manner provides advantages in that the string can be smoothly guided in spite of the sinuous path and that even in operations on rainy days, string is prevented from getting wet before it is supplied to the needle.

Further, in FIGS. 12 and 37 in which stalk discharging means (350–355, 358–360, and 362) is shown, a discharge belt 351 is trained around a pulley 350 fixedly secured to the oblique shaft 77 below the raised portion 96 at one end and a pulley 352 rotatably mounted on the shaft 354 at the free end of a telescopic shaft 353 having one end 355 pivotally mounted on said oblique shaft 77 so as to be swingable therearound.

An attachment plate 361 loosely fitted on said oblique shaft 77 has its one end 356 engaged with the skeleton frame 2. The telescopic shaft 353 is mounted for vertical adjustment of the angle of attachment thereof by means of bolt and nut means 358 and an arcuate elongated opening 357 formed in said attachment plate 361 with the axis of the oblique shaft 77 as its center of curvature. Connected through a support plate 362 to one of the elements forming said telescopic shaft 353 is a cover 359 which covers one side of the discharge belt 351. Also, the cover is provided with a belt support 360 positioned on the underside of the path of travel of the upper flight of the discharge belt 351.

Figure 30:
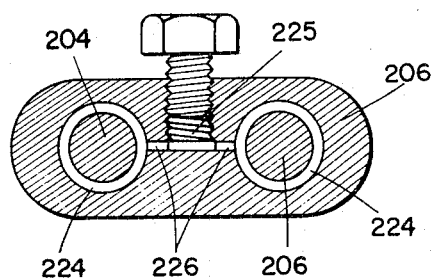
FIG. 30 is an enlarged front view, in longitudinal section, through a rotary shaft bearing for the tying assembly.
Figure 31:
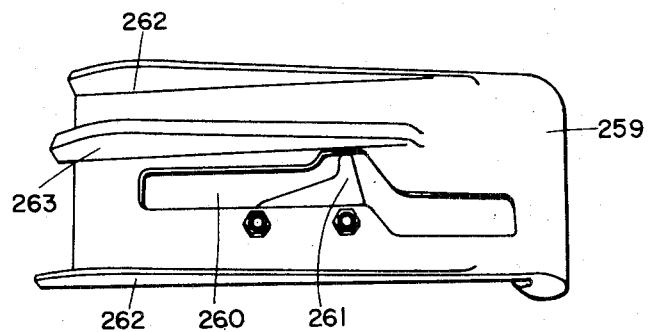
FIG. 31 is an enlarged front view of a side plate forming the boundary between the tying assembly space and the space occupied by the standing stalks to be bound.

The reference numeral 363 denotes a fixing bolt for adjustment of the length of the telescopic shaft 353. This arrangement is for the purpose of laterally and outwardly ejecting the delayed ears of the tied stalks to be ejected by the upper and lower ejecting arms 250 and 252. The discharge belt 351 moves faster than the ear transfer belts ventive peripheral surface 215 provided on the lower side of the rotary plate 212, thereby to prevent the rotation of the rotary shafts 204 and 206 when the bevel gears 213 and 214 are not engaged with the sector gear 211. A cam 220 (FIG. 28–a) acting on a cam follower roller 219 operatively connected to the movable panel 218 of the bill 203 is provided on the support frame 207, and a presser plate 221 for urging the cam follower roller 219 against the cam 220 is supported on the support frame 207 by means of a transverse shaft 222. A spring 223 is provided for urging the presser plate 221. As shown in FIG. 30, a grease cup 225 communicates with bearing bores 224 for the rotary shafts 204 and 206 through an oil groove 226.

As shown in FIGS. 27–b and 28–a, coupling between the rotary plate 212 and the member 210 is such that they are circumferentially adjustably attached by means of bolts 228 and a plurality of circumferential elongated openings 227 in the rotary plate 212, one of the bolts 228 having loosely fitted thereon a plate 230 having an offset stepped peripheral surface 229, and a pin 213 engaged with the offset stepped peripheral surface 229 projects from the rotary plate 212, so that by altering the position of engagement between the offset stepped peripheral surface 229 and the pin 231, the altered condition of phase of attachment of the vertical shaft 209 and rotary plate 212 can be achieved. This arrangement is for the purpose of adjusting the timing lug between a needle drive shaft 232 (FIG. 28–b) and the vertical shaft 209 (FIG. 28–a), by utilizing the slack of a chain 235 operatively interconnecting, within said flat transmission casing, a sprocket wheel 233 attached to the needle drive shaft 232 and a sprocket wheel 234 attached to the vertical shaft 209.

The reference numeral 236 (FIGS. 28–a and 32) denotes a sprocket wheel for tightening the chain 235, and an adjusting bolt 237 (FIG. 28–a) projects above the flat transmission casing 201. In FIGS. 27–b and 29, in which stalk ejecting means (250–258) is shown, an upper ejecting arm 250 has its one end pivotally mounted on the rotary plate 212 by means of a shaft 251 in offset relation to the axis of said rotary plate, said arm 250 being connected to a lower ejecting arm 252 by means of a transversely bent lever 253. The lower ejecting arm has a link 254 extending rearwardly, which link 254 is pivotally connected through a vertical shaft 254 to the free end of a swing link 257 pivotally connected through a vertical shaft 256 to a support arm 255 (FIG. 28–a) connected to said intermediate member 208. The reference numeral 259 (FIGS. 27–b and 28–a) denotes a side plate provided between the tying space and the tying assembly (bill and holder unit) space and connected to said intermediate member 208.

As shown in FIGS. 28–a and 31, the side plate has a needle passing and string guiding elongated opening 260. An upwardly extending projection 261 for temporarily locking a string is attached to said side plate intermediate between the ends of said opening 260. This serves to temporarily lock a string supplied by the needle, to assure the positive string hooking action of the bill. Further, the side plate 259 has projecting fins 262 on the upper and lower sides thereof facing the tying space and has a central fin 263 above the opening 260.

The reference numeral 264 (FIGS. 28–a and 29) denotes a transparent cover connected to the side plate 259 and overlying the tying assembly. The reference numeral 265 (FIGS. 27–b and 29) denotes a stationary barrier bar extending from adjacent the front end of the flat transmission casing 201 to a point spaced from the outer side of the intermediate upper surface 200.

As shown in FIGS. 27–a and 28–b, a needle 271 is pivotally mounted on a vertical shaft 270 supported on the flat transmission casing 201 so that the needle is swingable around the axis of the vertical shaft 270. A link 273 pivotally connected through a vertical pin 272 to the intermediate portion of the needle 271 has its free end pivotally connected through a vertical shaft 274 to a rotary arm 275 extending from the upper end of the needle drive shaft 232. The latter shaft has a gear (driving wheel) 276 loosely fitted thereon for rotation and meshing with a gear 277 secured to a driven shaft 278. A sprocket wheel 279 secured to the driven shaft 278 and a sprocket wheel 280 secured to the vertical shaft 41 (FIGS. 8 and 9) are operatively interconnected by a chain 281 trained therearound. The reference numeral 282 (FIGS. 8 and 9) denotes a chain tightening sprocket wheel.

Secured to the driven shaft 278 is a rotary arm 283 to which the intermediate portion of the raking-in packer 284 is pivotally connected through a vertical shaft 283'. A bent link 287 pivotally connected through a vertical pin 285 to the free end of the raking-in packer 284 has its free end loosely fitted on a vertical shaft 286 supported by the flat transmission casing 201. With this arrangement, reaped stalks transversely transferred to the raking-in packer 284 by the rotation of said driven shaft 278 will be raked and transferred to the tying space.

The front end 288 of the raking-in packer 284 is small in thickness and pointed for easy thrusting into a group of stalks, and the forward side portion of the raking-in packer 284 extending rearwardly of said front end 288 is provided with a wide erected portion 289 suitable for transfer of stalks. Further, the locus traveled by the front end 288 of the raking-in packer 284 at the time of raking-in is arcuate. In this case, since said front end 288 moves in such a condition as to overlap the projecting fin 262 of the side plate 259, it is possible to dependably transfer stalks without leaving a triangular space between said locus and the side plate 259, that is, without leaving the stalks to be fed into the tying space.

Figure 32:
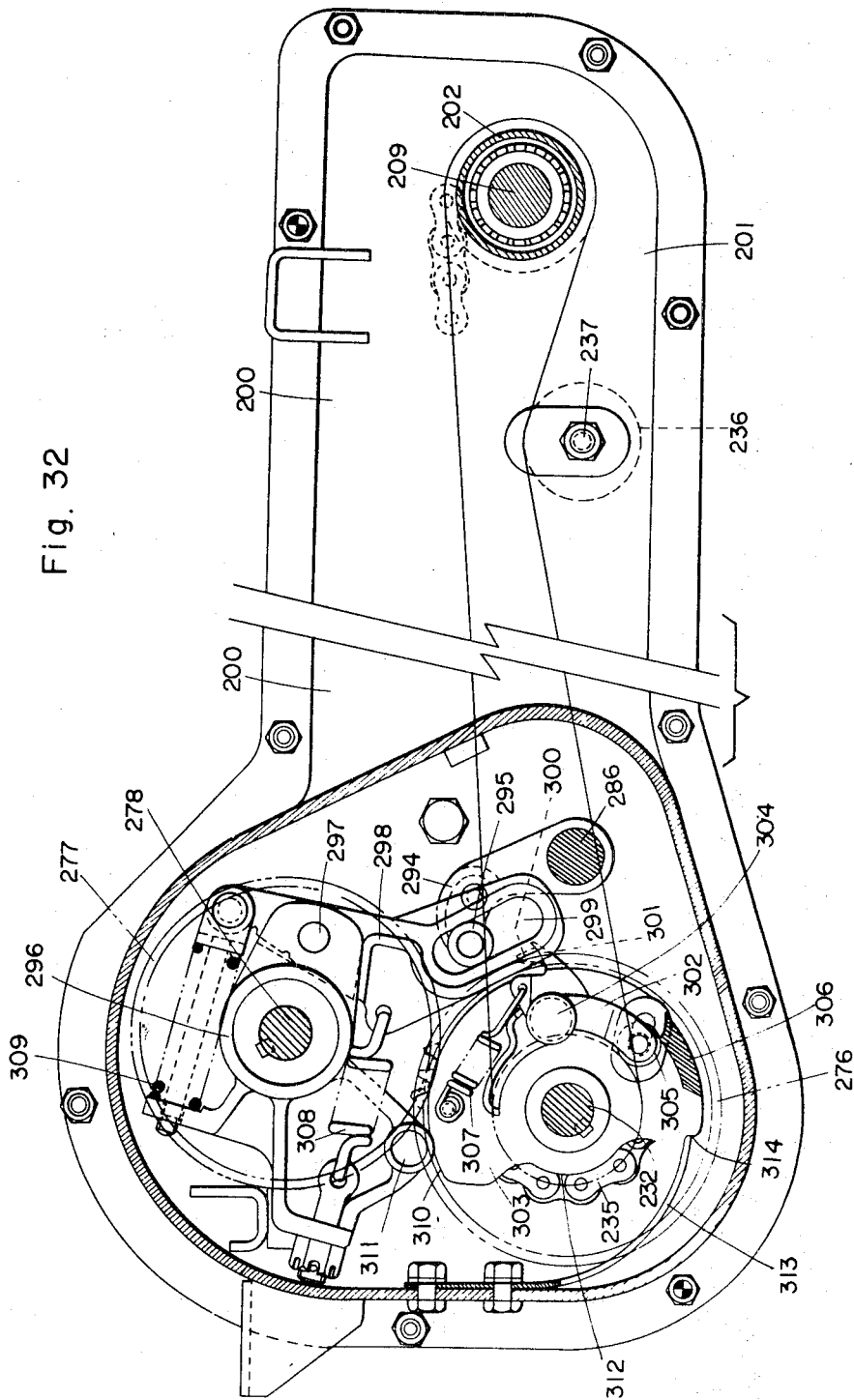
FIG. 32 is an enlarged fragmentary plan view, with parts broken away and shown in section, showing a mechanism contained in the transmission casing for the binding device.
Figure 33:
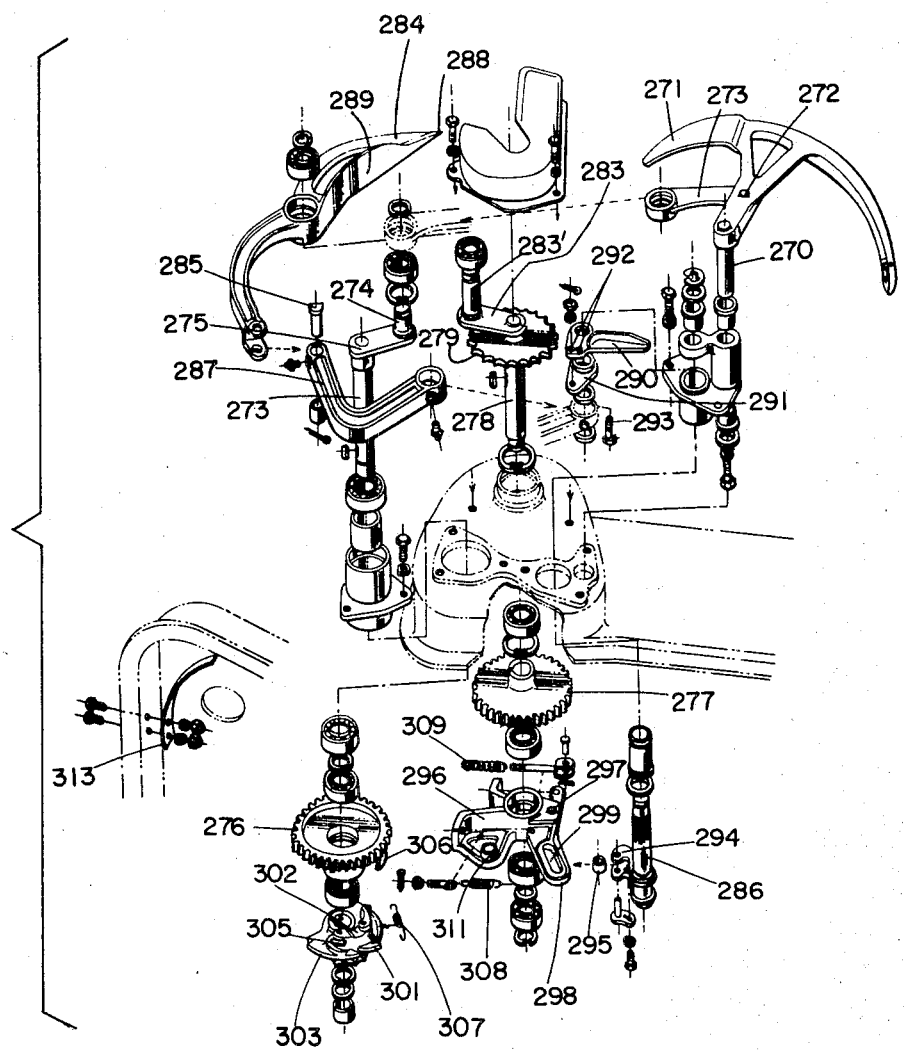
FIG. 33 is an enlarged perspective view showing the raking-in assembly and the string supplying assembly of the binding device, and their associated parts.
Figure 34:
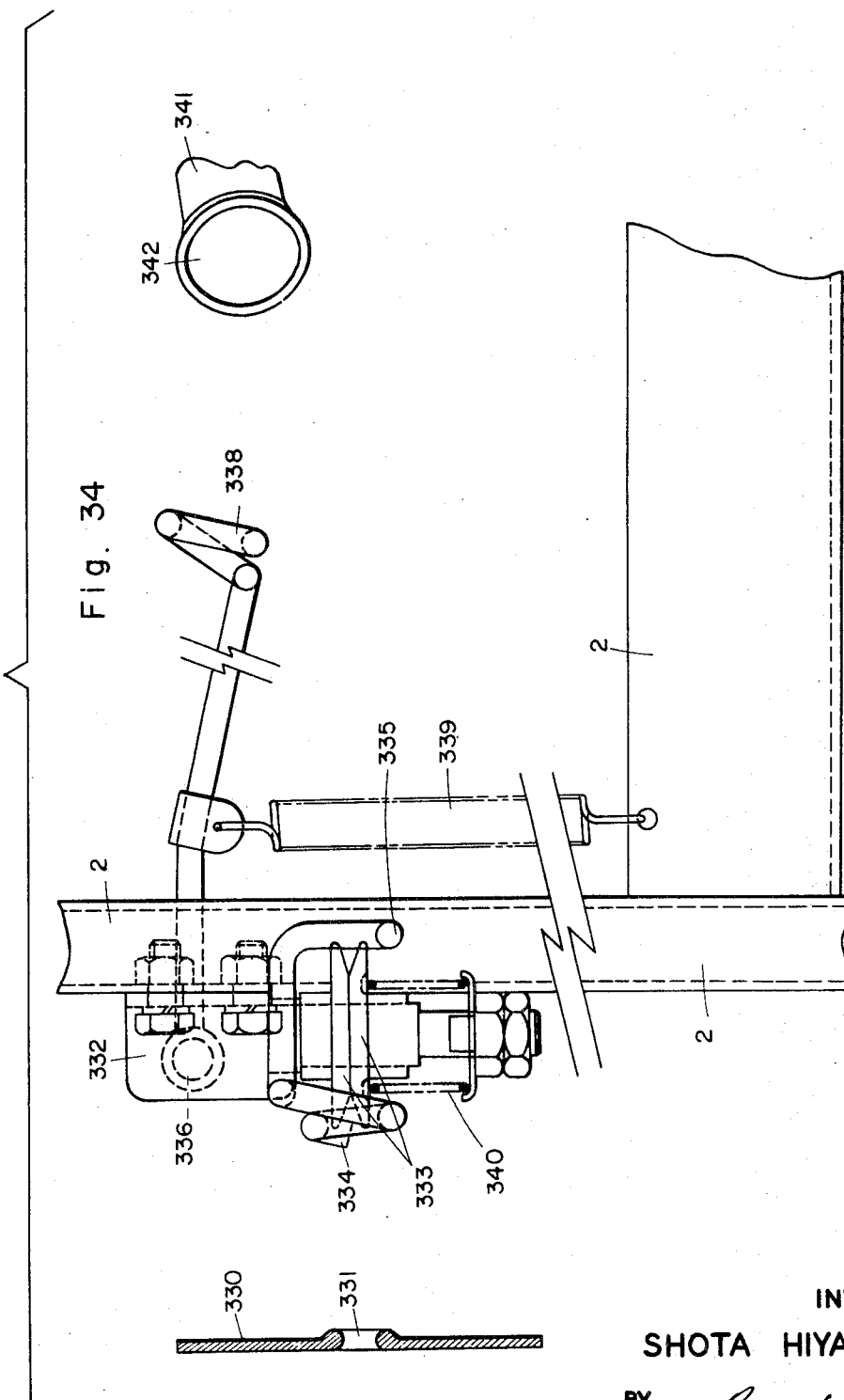
FIG. 34 is an enlarged fragmentary plan view showing the string brake device and its associated parts.
Figure 35:
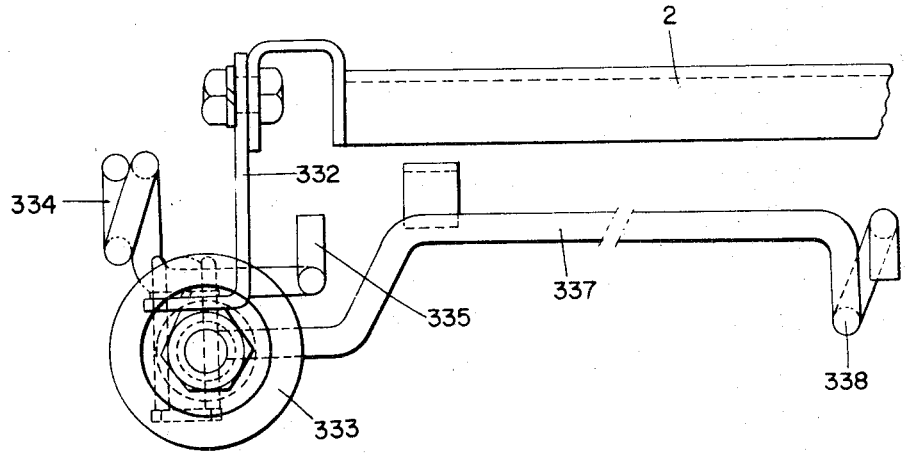
FIG. 35 is an enlarged side view of the principal portion thereof.

The reference numeral 290 denotes a stalk stopping door for stopping groups of stalks which are being transferred by the raking-in packer 284. The door 290 is loosely fitted on said vertical shaft 286, and is so connected by means of a plurality of circumferential openings 292 and a bolt 293 to an attachment plate 291 secured to the vertical shaft 286 that the angle of attachment thereof may be changed. A roller 295 is pivotally mounted on the front end of a third member (projecting arm) 294 extending from the lower end of the vertical shaft 286. As shown in FIG. 32, the roller 295 is loosely fitted in an elongated opening 299 formed in a second member (floating member) 298 pivotally connected through a vertical pin 297 to a first member (loosely fitted member) 296 rotatably supported on said driven shaft 278. The floating member 298 is provided with a pawl 300 engageable with a pawl 301 projecting from a movable member 302 pivotally connected through a vertical shaft 304 to a disk cam 303 secured to the needle drive shaft 232. The movable member 302 pivotably mounts at the front end thereof a driven roller 305 engageable with a transmission projection 306 attached to the gear 276 (FIG. 28–b) and serving to impart rotation to the needle drive shaft 232. A spring 307 (FIG. 32) pulls the movable member 302 to bring the pawl 301 into engagement with the pawl 300, and a tension spring 308 cooperates with a compression spring 309 to swing the floating member 298 to bring the pawl 300 into the path of turning of the pawl 301. The disk cam 303 is provided with a peripheral surface 310 extending by about 180 degrees and a roller 311 abutting against said peripheral surface is pivotally mounted on said loosely fitted member 296. This is for the purpose of preventing the loosely fitted member 296 from being rotated when the fed stalks exert a force on the stalk stopping door 290 with the disk cam 303 in the illustrated stopped position. In order that said stalk stopping door may be retracted with minimum resistance at the time of ejection of the stalks, the disk cam 303 is provided with a peripheral recess 312 for allowing the rotation of the roller 311 around the axis of the driven 66 and 67, because the pulley 350 is larger in diameter than the pulleys 78 and 79. Further, the existence of the raised portions 95 and 96 precludes the possibility that the stalks to be gathered together in the upstream of the raised portions 95 and 96 are caught with the discharge belt 351.

The functions of the entire machine are as follows:

The machine is advanced in such a manner that each dividing board 110 (FIG. 12) comes between adjoining rows of planted stalks (crops). At the front ends of these dividing boards 110, the pick-up nails 127 which are then projected laterally by the abutment projections 137 (FIGS. 15 and 16) enter the stalks adjacent the stubs thereof located between adjoining dividing boards 110, and move upwardly whereby the pick-up nails raise up these planted stalks, even if the latter are considerably prostrated. In this case, since the component of velocity of the pick-up nail in a direction opposite to the direction of travel of the machine is greater in the absolute value than the forward speed of the machine, the stalks will be raised rearwardly and upwardly.

The stub portions of the planted stalks which are being raised up by the pick-up nails in this manner enter the path defined by the support plate 161 (FIG. 12) and the stalk introducing and guiding elastic plate 182 and are raked toward the mower by the stub raking-in rotating body 172. At this time, the stalk introducing and guiding elastic plate assures that the stub portions of the planted stalks are positively acted upon by the stub raking-in rotating body 172. The stub portions of the planted stalks thus raked in by the stub raking-in rotating body are cut by the movable blade body 46 of the mower 45, and concurrently they are raked and transversely transferred by said stub raking-in rotating body 172.

The posture of the stalks at this time is such that the stalks are bent by the pick-up nails 127 so as to extend along the ← figure shaped transversely transferring guide surface formed by the various transversely transferring guide plates 91–94 and 100 (FIG. 11). When the stub portions are cut by the mower, the ears of the stalks leave the pick-up nails 127 and are then raked toward said transversely transferring guide surface by the upper first, second and third raking-in rotating bodies 164–166. Therefore, substantially at the same time as the cut stalk stub portions engage the transport lugs 74 (FIG. 12), which are transversely moving, ears also make contact engagement with the other transport lugs 71 and ear transfer belts 66 and 67.

The stalks to be transversely transferred by the transversely transferring means will be positively transversely transferred by the urging action of the entanglement-preventing and transversely transferring assisting elastic rods 178, entanglement preventing and transversely transferring assisting elastic plates 180, and stalk introducing and guiding elastic rods 181.

In addition, while the ear transfer belts 66 and 67 are decreased in transport capacity in order to decrease the falling-out of grains as compared with the transport lugs 71 and 74, the raking-in rotating bodies 165 and 166 are positioned more spaced from the transversely transferring guide surface than the raking-in rotating body 164 in order to avoid the clogging of the stalks in the raking-in rotating bodies 165 and 166 (FIG. 11). Further, this also makes it possible to smoothly transversely transfer bulky ears. Further, the entanglement preventing and transversely transferring assisting elastic rods 178 (FIG. 12) and stalk introducing and guiding elastic rods 181 have the function of smoothing the introduction of newly reaped stalks into the preceding stalks which are being transversely transferred.

The pulleys 68 and 69 which drive the ear transfer belts 66 and 67 (FIG. 8) are larger in diameter than the sprocket wheels 73 and 76, so that the ear transfer belts are faster than the transport lugs 71 and 74, thereby eliminating the tendency of ears to delay. Further, since the stub raking-in rotating body assembly positioned at the terminal end of the transversely transferring path is embodied in the form of two vertically spaced raking-in rotating bodies 172 and 173 (FIG. 11), the transport action is prevented from becoming dull at said raking-in rotating body assembly when the transport action of the transport lugs 74 is nullified at said raking-in rotating body assembly by the stalk releasing plate 99, and when the amount of stalks to be transported becomes maximum at said terminal end. Accordingly, the reaped stalks can be positively raked and transferred to the tying space.

While stub portions are thus released from the action of the transversely transferring means by means of the stalk releasing plate 99, ears are continuing to be transferred up to a position short of the raised portions 95 and 96 (FIG. 12) by the transport lugs 71 and ear transfer belts 66 and 67. Said released stub portions are raked and transferred to the stalk stopping door 290 by the raking-in packer 284 (FIG. 27–a), which is constantly reciprocating. The ears of the stalks thus raked and transferred up to a position short of the stalk stopping door 290 are released from the transport action of the ear transport belts 66 and 67 by the raised portions 95 and 96 (FIG. 12) and collected at a position short of the raised portions. At this time, the collecting presser plate 185 and collecting presser bar 187 function to prevent said collected stalks from being transversely delivered by the succeeding stalks which are being transversely transferred. When a fixed amount of stalks are collected in this manner, the stalk stopping door 290 (FIG. 27–a) operates to initiate tying operations, as mentioned before. After completion of the tying operation, the tied stalks to be ejected by the upper and lower ejecting arms 250 and 252 (FIG. 27–b) pass through a clearance between the collecting presser bar 187 (FIG. 12) and the raised portion 96 and are transversely ejected while turning the collecting presser plate 185 upwardly around the axis of the transverse shaft 186 against the spring associated with the plate 185. At this time of ejection, the discharge belt 351 functions to transversely deliver the delayed ears of the tied stalks being ejected, as mentioned before. When the machine has to run on a road, in order that the discharge belt may not interfere, the bolt and nut means 368 (FIG. 37) can be loosened to turn the telescopic shaft 353 downwardly around the axis of the oblique shaft 77.

Figure 38:
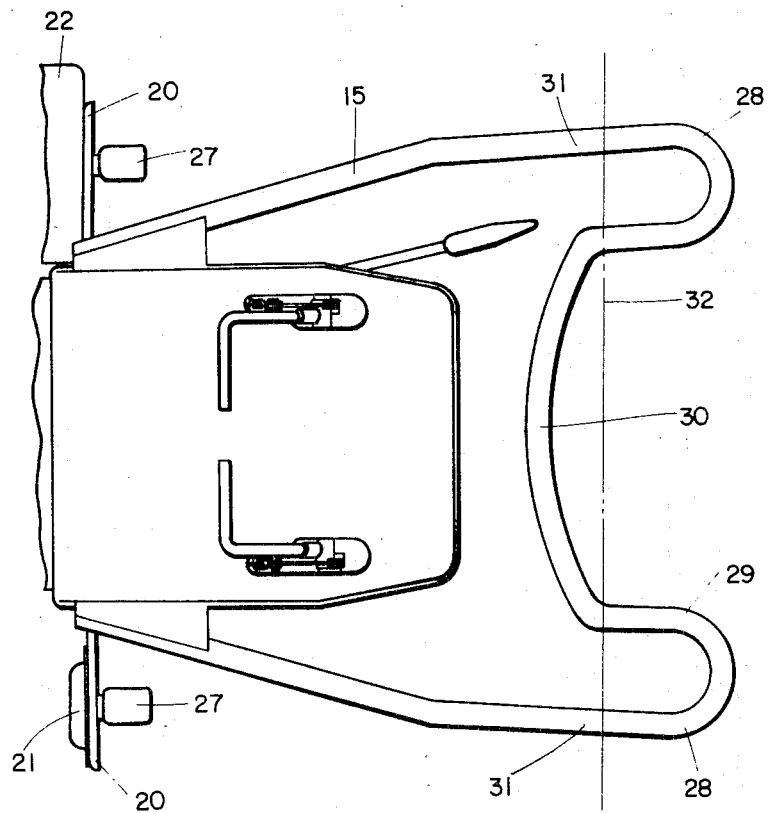
FIG. 38 is an enlarged plan view showing the shape of the handle.

Further, as shown in FIG. 38, if the handle 15 is so arranged that an intermediate portion 30 of a connecting lever 29 connecting the opposed end portions 28 of the handle is forwardly indented beyond an imaginary transverse straight line 32 passing across the opposed grip portions 31, the operator can hold the grip portions 31 at positions on both sides of his body substantially without being interfered with by the connecting lever 29, so that a force can be easily applied vertically to the handle 15 in order to raise and lower the front portion of the machine. Moreover, this arrangement makes the handle very rugged.

FIGS. 39 and 40 show an arrangement wherein a string passing member 380 which is made of an elastic rod and which is projected through the string guide tube 341 in passing a string through the string guide tube 341 is adapted to be received in the tube of the handle 15 through the front end opening 381 of the handle 15, and wherein the handle 15 is provided with a hole 384 in which is fitted a projecting portion 383 provided on the free end turned-back portion 382 of the string passing member 380, thereby preventing the member 380 from slipping out. The reference numeral 385 denotes a string engagement member formed on the string passing member 380.

FIG. 41 shows an arrangement wherein the handle 15 is positioned displaced from the center of the reaping width of the mower 45 toward the binding means, so that the operator may easily keep his watch during running of the machine, over-functioning of the binding means and ejection of tied stalks. In addition, if the free edge 91 of the uppermost transversely transferring guide plate 91 is rearwardly inclined, as illustrated, this is convenient for the operator in that he can more easily observe the ejection of tied stalks.

Figure 42:
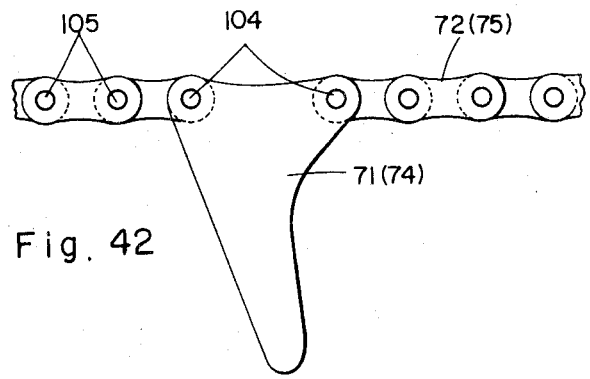
FIG. 42 is an enlarged plan view showing a transversely transferring lug.

As shown in FIG. 42, better results will be obtained if the distance between pivot pins 104 at the opposed ends of the transport lugs 71 (74) is made longer than the distance between link joint pins 105 of the chain 72 (75) to increase the strength of the transport lug, and the sprocket wheel associated therewith is made small in diameter for smooth rotation. In addition, in this case, more than one of the teeth of the sprocket wheel will engage between the pins 104 at a time.

While it is possible to embody a harvester according to the invention in the type steered by an operator while he is walking, as described in the preceding embodiment, such harvester may also be of the pushed or pulled type, attached to the front, side or rear of a tractor.

FIG. 44 illustrates a manner in which a harvester 390 according to the invention is connected to the front end of a tractor 391 through a connection 392 adapted to allow the vertical movement of the harvester 390. Such vertical movement may be effected by a hydraulic cylinder 393. In this embodiment, the transmission of power to the harvester 390 is effected by a transmission system comprising a counter shaft 396 operatively connected to a power shaft 395 extending from an engine 394 for the tractor 391, clutch means contained in a housing 397, and a transmission shaft 398 operable irrespective of the vertical movement of the harvester 390.

In order to realize still better binding operation, the binding means may be constructed as per illustrated in FIG. 45 wherein the needle 271 is provided with a portion 400 which, when said needle 271 is supplying a string to the tying assembly 203 and 205, serves for preventing said packer 284 from continuing to urge the succeeding stalks into the binding space 401.

By this disposition, the setup may be reduced to a very simple one, since there is no need of any device for stopping the packer 284 during the binding operation or of any movable barrier means for keeping the succeeding stalks away from the operative reach of the packer 284.

In the illustration, the packer 284 is to move beyond the stalk compacting corner 402 of the needle 271 into the region where stalks to be tied are held. This will serve for realizing better compact tying of the stalks.

The tying assembly 203 and 205 included in the binding device is actuated when said packer 284 is moved beyond the stalk compacting corner 402 of the needle 271, which is in its string supplying position thereby to further compact the stalks so that the stalks are bound without loosening of the compact form.

It will be seen from the foregoing that the harvester according to the present invention is capable of satisfactorily raising up rice plants, barley and wheat which have been prostrated to the extreme due to storm, flood and the like, much more those crops which are bent due to the weight of grains having reached their full growth, by means of pick-up means attached to the harvester, cutting them positively at the sub-portions thereof, and transversely transferring the cut stalks by transverse transferring means. This not only assures that the reaping height is fixed, but also prevents the stalks which are being transported by the transverse transfer means from being disturbed, these features being advantageous particularly in an instance in which as contrasted to grains recovered by the conventional type combine provided with a pick-up reel, it is desired to obtain grains in undamaged conditions suitable for use as seeds, and an instance in which the reaped stalks are subjected to threshing operation in such a manner that the ears alone are threshed by a threshing cylinder. Further, the harvester is capable of automatically tying the thus reaped and transversely transferred stalks in the form of groups of stalks, each in a substantially equal amount, and automatically and successively deflecting and ejecting them so that they may lie on the ground side by side, or stated more particularly, the individual tied stalks may be arranged transversely of the direction of travel of the machine, thus making it possible to promote windrowing effect and subsequent collecting or recovering operation.

I claim:

1. A harvester for reaping and binding stalks of grain, comprising: frame means; cutting means carried by said frame means and facing toward the direction of travel of the harvester, and including a transversely elongated cutter blade disposed close to the ground; a plurality of dividing boards carried by said frame means and spaced transversely across said harvester, said boards facing toward the direction of travel of said harvester and including upper sides that extend obliquely upwardly and rearwardly from a position in front of said cutter blade; stalk pick-up means provided with a plurality of stalk picking-up nails adapted to move along said inclined upper sides of said dividing boards, said stalk pick-up means being adapted to pick up substantially all the stalks to be cut, and the path for the travel of said nails extending from a position in front of said cutter blade to a position in the rear of and above said cutter blade; stalk-leaning transversely transferring guide plate means supported by said frame means and disposed adjacent to said cutter blade, said guide plate means extending upwardly and rearwardly with respect to the direction of travel of the harvester from a position at the rear of said cutter blade and having an intermediate curved portion between the upper and lower ends thereof which is curved upwardly and rearwardly in convex form, said curved portion being disposed under said path of said pick-up means for picking-up stalks at a position further forward in the direction of travel of the harvested than the position immediately below the upper end of said path; stalk transversely transferring means, comprising a plurality of transversely moving endless band-like units mounted along the front surface of said transversely transferring guide plate means; drive wheels carried by said frame means and disposed under said transversely transferring guide plate means, said drive wheels being so positioned that when said harvester is viewed from the front they are substantially hidden; an engine carried by said frame means and operatively connected to drive said harvester; a handle connected to said frame means and disposed rearwardly of the axis of said drive wheels, for use by a walking operator to maneuver said harvester; a stalk-leaning binding plate connected to the terminal portion of said transversely transferring guide plate means outwardly of all said dividing boards and forming an extension of said guide plate means, said binding plate serving to collect and hold stalks cut by said cutter blade and transferred thereto; and binding means carried by said frame means and disposed at said binding plate to cooperate therewith for binding said collected stalks.

2. The harvester as claimed in claim 1, wherein said transversely transferring guide plate means is provided at its upper end with a backwardly curved portion.

3. The harvester as claimed in claim 1, wherein the marginal side part toward the stalk discharge direction of said stalk-leaning binding plate is raised and is curved forwardly and obliquely upwardly from the plane of said guide plate means.

4. The harvester as claimed in claim 1, wherein at least one collecting pressure plate is disposed above said stalk-leaning binding plate, said pressure plate being attached to the outer side surface of the one of said dividing boards which is positioned nearest the terminal end of said guide plate means.

5. The harvester as claimed in claim 1, wherein the free marginal side part of said stalk-leaning binding plate is formed as a raised portion, and a collecting pressure plate is disposed above said stalk-leaning binding plate, said pressure plate being attached to the outer side surface of the one of said dividing boards which is positioned nearest the terminal end of said guide plate means.

6. The harvester as claimed in claim 1, wherein raking-in means are disposed above and adjacent to said cutter blade between each pair of said dividing boards, said raking-in means being adapted for rotation about approximately vertical axes thereof, a path for transferring stalks being provided between each said raking-in means and one of said dividing boards adjacent thereto; elastic rods extending from said dividing boards toward the transverse transfer direction of said transversely transferring means, and having free ends disposed close to said raking-in means and to said transversely moving endless band-like units along said transverse transfer guide plate, the shafts of said raking-in means being operatively associated with said engine.

7. The harvester as claimed in claim 6, wherein the one of said raking-in means positioned inwardly of the one of said dividing boards which is closest to said binding means comprises lower and upper rotating bodies.

8. The harvester as claimed in claim 1, wherein a transmission casing housing therein a transmission unit for said binding means is disposed under said binding means, said casing including a casing plate, and a space for a stalk transfer path being provided above said casing plate at the center of said transmission casing, said transmission unit having rotary shafts disposed at the front and rear ends of said casing and projecting upward beyond the level of the casing plate at the center of said casing, said rotary shaft at the front end of said casing serving as a drive shaft for a bill, holder and stalk ejecting means belonging to said binding means, and said rotary shafts at the rear end of said casing serving as drive shafts for driving a driven shaft, raking-in packer and needle, also parts of said binding means.

9. A harvester for reaping and binding stalks of grain, comprising: frame means; cutting means carried by said frame means and facing toward the direction of travel of said harvester, and including a transversely elongated cutter blade disposed close to the ground; a stalk-leaning transversely transferring guide plate carried by said frame means and disposed adjacent to said cutter blade and extending upwardly and rearwardly with respect to the direction of travel of the harvester from a position at the rear of said cutter blade, said guide plate having an intermediate curved portion between the upper and lower ends thereof which is curved upwardly and rearwardly in convex form; stalks transversely transferring means disposed along the front surface of said guide plate, and comprising moving endless band-like units; a stalk-leaning binding plate for collecting and holding stalks connected to the terminal portion of said guide plate; binding means carried by said frame means and disposed at a side portion of said cutter blade to the front and rear of the lower end of said binding plate; and a transmission casing disposed under said binding means and housing therein a transmission unit for said binding means, said casing including a casing plate, and a space for a stalk transfer path being provided above the casing plate at the center of said transmission casing, said transmission unit having rotary shafts disposed at the front and rear ends of said casing and projecting upward beyond the level of the casing plate at the center of said casing, said rotary shaft at the front end of said casing serving as a drive shaft for a bill, holder and stalk ejecting means belonging to said binding means, and said rotary shafts at the rear end of said casing serving as drive shafts for driving a driven shaft, raking-in packer and needle, also parts of said binding means.

10. The harvester as claimed in claim 9, wherein the upper surface of said transmission casing serves as a stalk receiving deck.

11. The harvester as claimed in claim 9, wherein ejecting means included in said binding means comprises a bound stalk ejecting arm provided by a link motion mechanism which acts on bound stalks intermittently.

12. The harvester as claimed in claim 11, wherein a forcibly driven discharge belt for transferring ears of bound stalks extends outwardly from said stalk-leaning plate for binding stalks in the direction of discharge of stalks, said discharge belt being provided with means for adjusting distance between the forward end thereof and the ground.

References Cited

UNITED STATES PATENTS

| 2,333,080 | 11/1943 | Aasland | 56—119 X |
| 3,423,910 | 1/1969 | Shimamoto | 56—20 |

FOREIGN PATENTS

| 215,206 | 5/1961 | Austria. |
| 643,863 | 7/1962 | Canada. |

ANTONIO F. GUIDA, Primary Examiner

U.S. Cl. X.R.

56—119